US012668143B2

(12) United States Patent
Lee

(10) Patent No.: US 12,668,143 B2
(45) Date of Patent: Jun. 30, 2026

(54) MICROSCOPIC ALIGNMENT METHOD FOR WIRELESS CHARGING OF ELECTRIC VEHICLE AND APPARATUS AND SYSTEM THEREFOR

(71) Applicant: HYUNDAI MOBIS CO., LTD., Seoul (KR)

(72) Inventor: Jae Young Lee, Icheon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 907 days.

(21) Appl. No.: 17/863,590

(22) Filed: Jul. 13, 2022

(65) Prior Publication Data

US 2023/0202325 A1      Jun. 29, 2023

(30) Foreign Application Priority Data

Dec. 27, 2021      (KR) ........................ 10-2021-0188605

(51) Int. Cl.
H02J 50/80      (2016.01)
B60L 53/38      (2019.01)
B60L 53/66      (2019.01)
H02J 50/10      (2016.01)
H02J 50/90      (2016.01)

(52) U.S. Cl.
CPC ............... B60L 53/38 (2019.02); B60L 53/66 (2019.02); H02J 50/10 (2016.02); H02J 50/80 (2016.02); H02J 50/90 (2016.02)

(58) Field of Classification Search
CPC ................................. B60L 53/38; H02J 50/90
USPC ........................................................ 320/108
See application file for complete search history.

(56) References Cited

U.S. PATENT DOCUMENTS 5,821,731 A * 10/1998 Kuki ........................ B60L 53/14
                                                                    320/108
11,173,794 B2 * 11/2021 Tsukamoto ............. B60L 53/38
2013/0119925 A1      5/2013 Kawamura
2015/0115728 A1 *  4/2015 Yamamoto .............. H02J 50/60
                                                                    307/104

(Continued)

FOREIGN PATENT DOCUMENTS

CN      104283287 A      1/2015
CN      110014899 A      7/2019

(Continued)

OTHER PUBLICATIONS

Extended European Search Report Issued on Jan. 4, 2023, in counterpart European Patent Application No. 22183799.0 (9 Pages in English).

(Continued)

*Primary Examiner* — Ahmed H Omar
(74) *Attorney, Agent, or Firm* — NSIP Law

(57)      ABSTRACT

A microscopic alignment method for wireless charging of an electric vehicle, and an apparatus and system therefor. The microscopic alignment method includes determining whether the electric vehicle is stopped, based on the electric vehicle being stopped, making a request to the electric vehicle for generation of an induced current, measuring the induced current received through a wireless power transmission pad, performing fine alignment of the wireless power transmission pad based on the induced current, and based on the fine alignment being completed, transmitting wireless power via the wireless power transmission pad.

17 Claims, 13 Drawing Sheets

(56)        References Cited

U.S. PATENT DOCUMENTS

| | | | |
|---|---|---|---|
| 2018/0026483 A1 | 1/2018 | Mo et al. | |
| 2018/0170204 A1* | 6/2018 | Hell | B60L 53/305 |
| 2019/0016218 A1 | 1/2019 | Haag et al. | |
| 2019/0381891 A1* | 12/2019 | Moghe | G06N 20/00 |
| 2020/0207229 A1 | 7/2020 | Tateishi et al. | |
| 2022/0126709 A1* | 4/2022 | Yazaki | B60M 7/003 |

FOREIGN PATENT DOCUMENTS

| | | |
|---|---|---|
| JP | 2014-193095 A | 10/2014 |
| JP | 2017-143628 A | 8/2017 |

OTHER PUBLICATIONS

European Office Action Issued on Apr. 22, 2026, in Counterpart European Patent Application No. 22 183 799.0 (8 Pages in English).
Korean Office Action issued on May 21, 2026, in counterpart Korean Patent Application No. 10-2021-0188605 (8 pages in English, 8 pages in Korean).

* cited by examiner

FIG.2

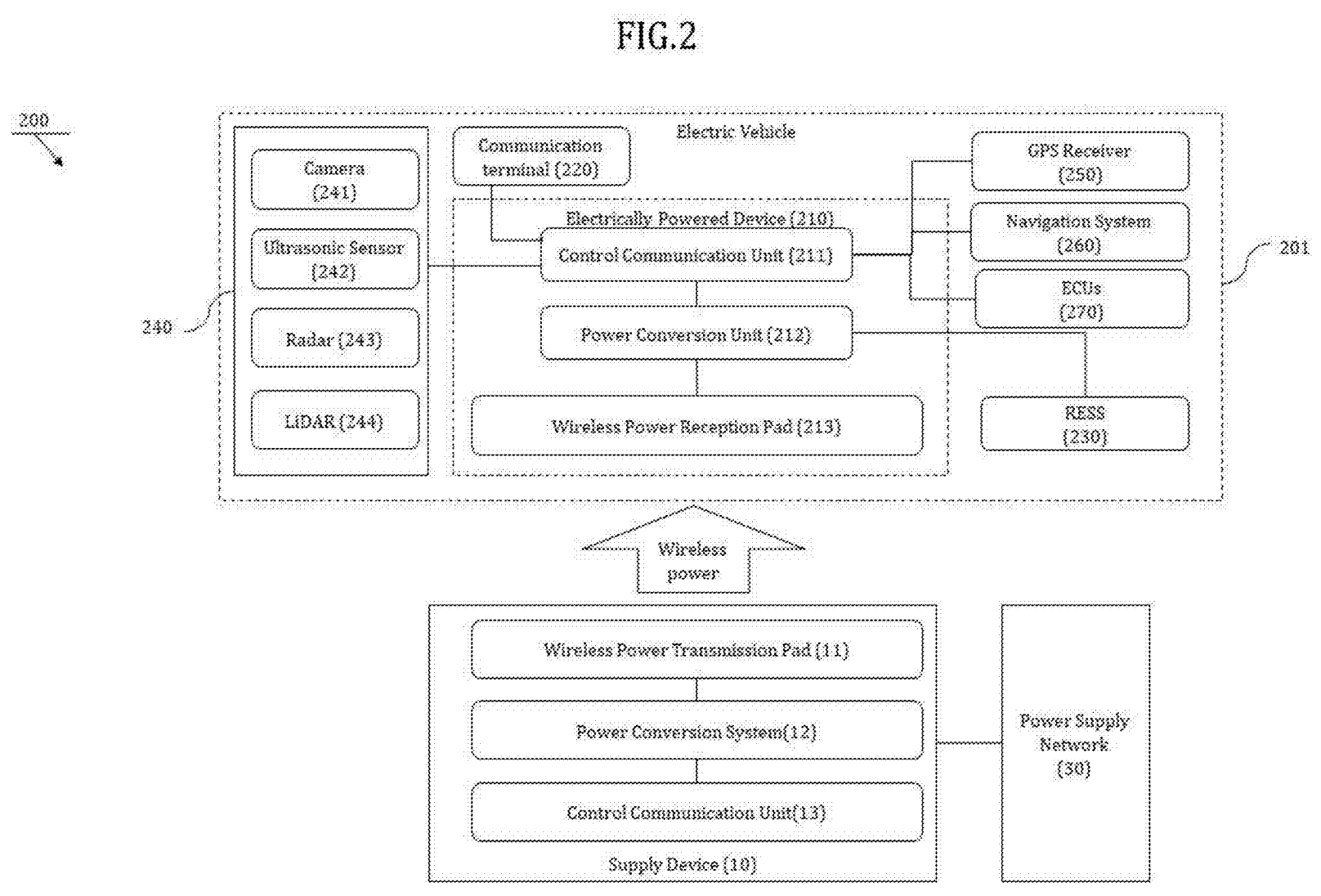

Electric Vehicle (201)

- GPS Receiver (250)
- Navigation System (260)
- ECUs (270)
- RESS (230)

Electrically Powered Device (210)
- Control Communication Unit (211)
- Power Conversion Unit (212)
- Wireless Power Reception Pad (213)

Communication terminal (220)

(240)
- Camera (241)
- Ultrasonic Sensor (242)
- Radar (243)
- LiDAR (244)

Wireless power

Supply Device (10)
- Wireless Power Transmission Pad (11)
- Power Conversion System (12)
- Control Communication Unit (13)

Power Supply Network (30)

200

Wireless Power Transmission Pad

Wireless Power Reception Pad

FIG.5

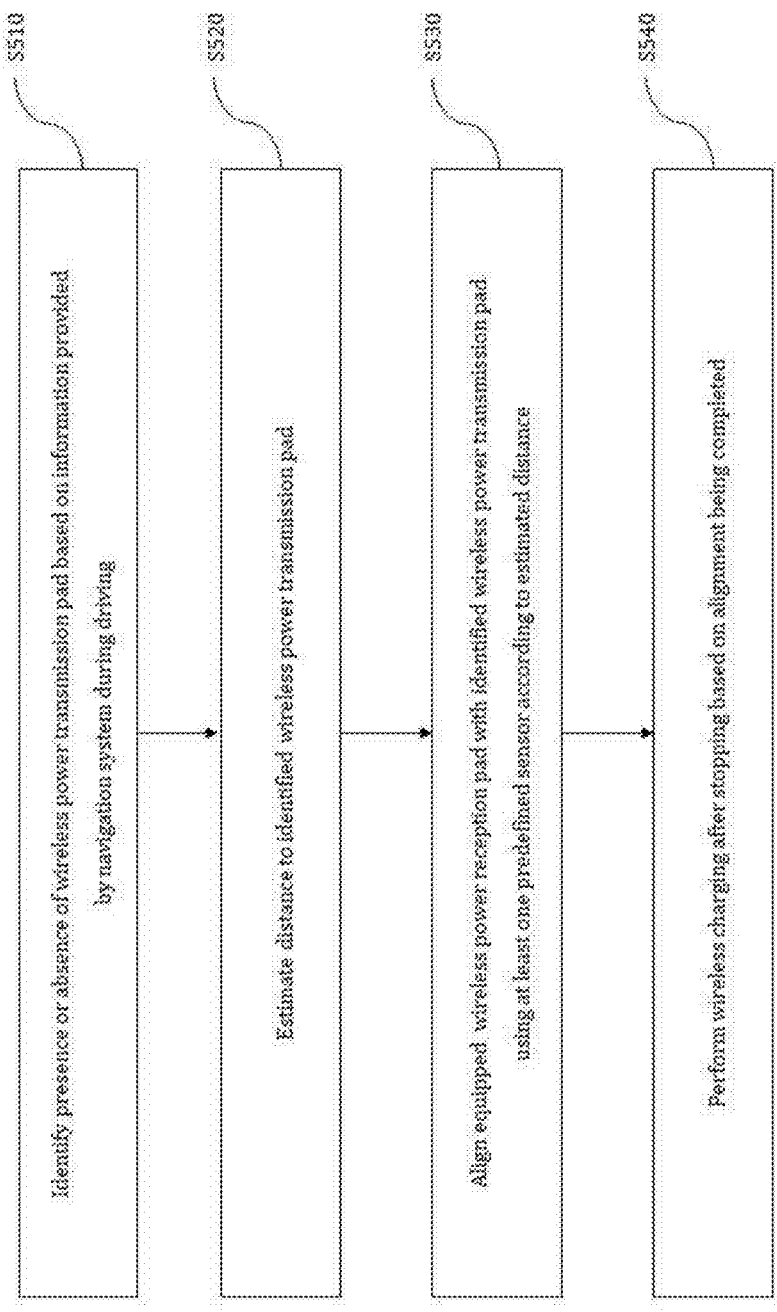

S510

Identify presence or absence of wireless power transmission pad based on information provided by navigation system during driving

S520

Estimate distance to identified wireless power transmission pad

S530

Align equipped wireless power reception pad with identified wireless power transmission pad using at least one predefined sensor according to estimated distance

S540

Perform wireless charging after stopping based on alignment being completed

FIG.7

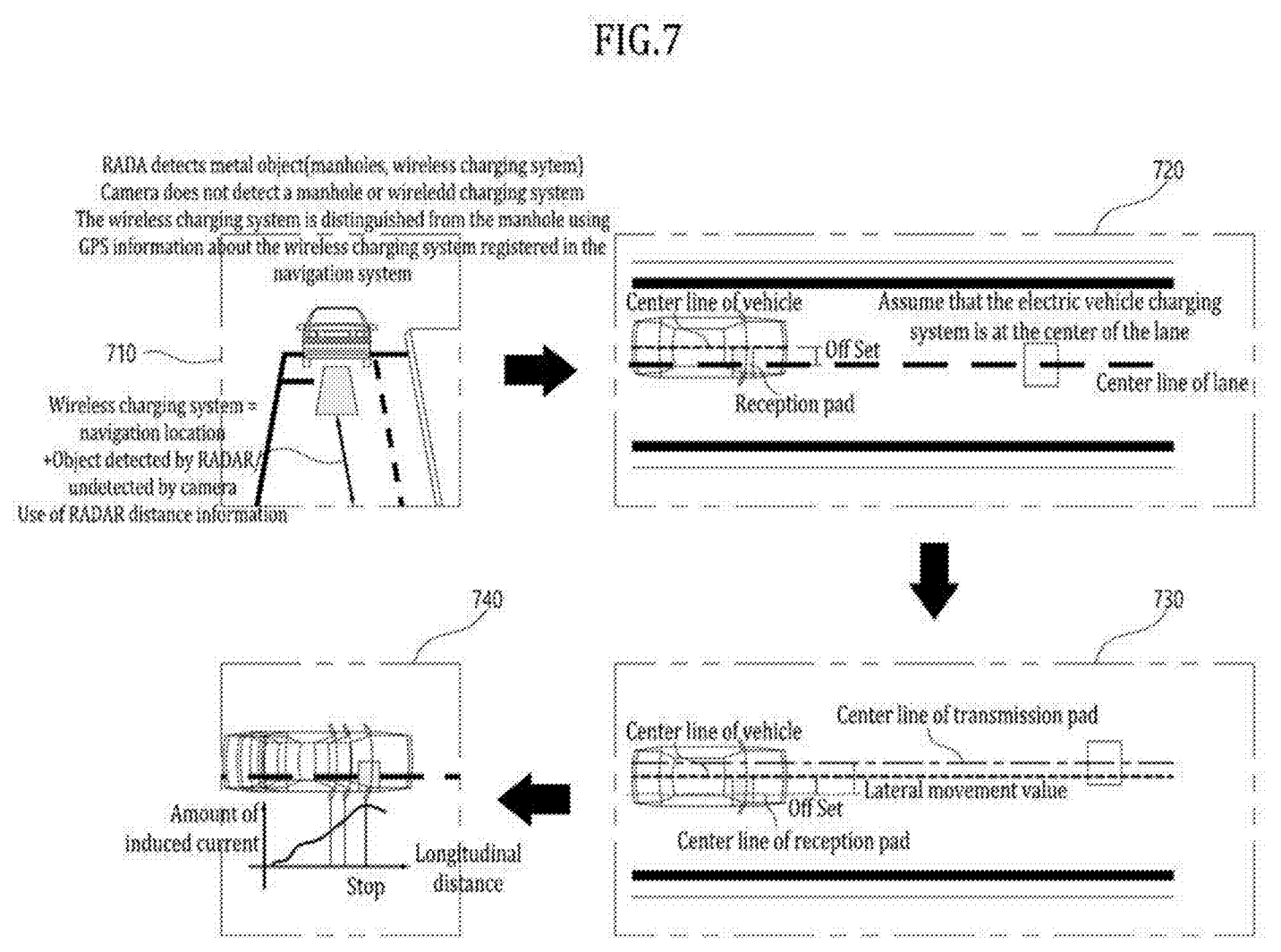

RADAR detects metal object(manhole, wireless charging system)
Camera does not detect a manhole or wireless charging system
The wireless charging system is distinguished from the manhole using
GPS information about the wireless charging system registered in the
navigation system

710

Wireless charging system =
navigation location
+Object detected by RADAR,
undetected by camera
Use of RADAR distance information

720

Assume that the electric vehicle charging
system is at the center of the lane

Center line of lane

Center line of vehicle

Off Set

Reception pad

730

Center line of transmission pad

Lateral movement value

Center line of vehicle

Off Set

Center line of reception pad

740

Longitudinal
distance

Stop

Amount of
induced current

FIG.9

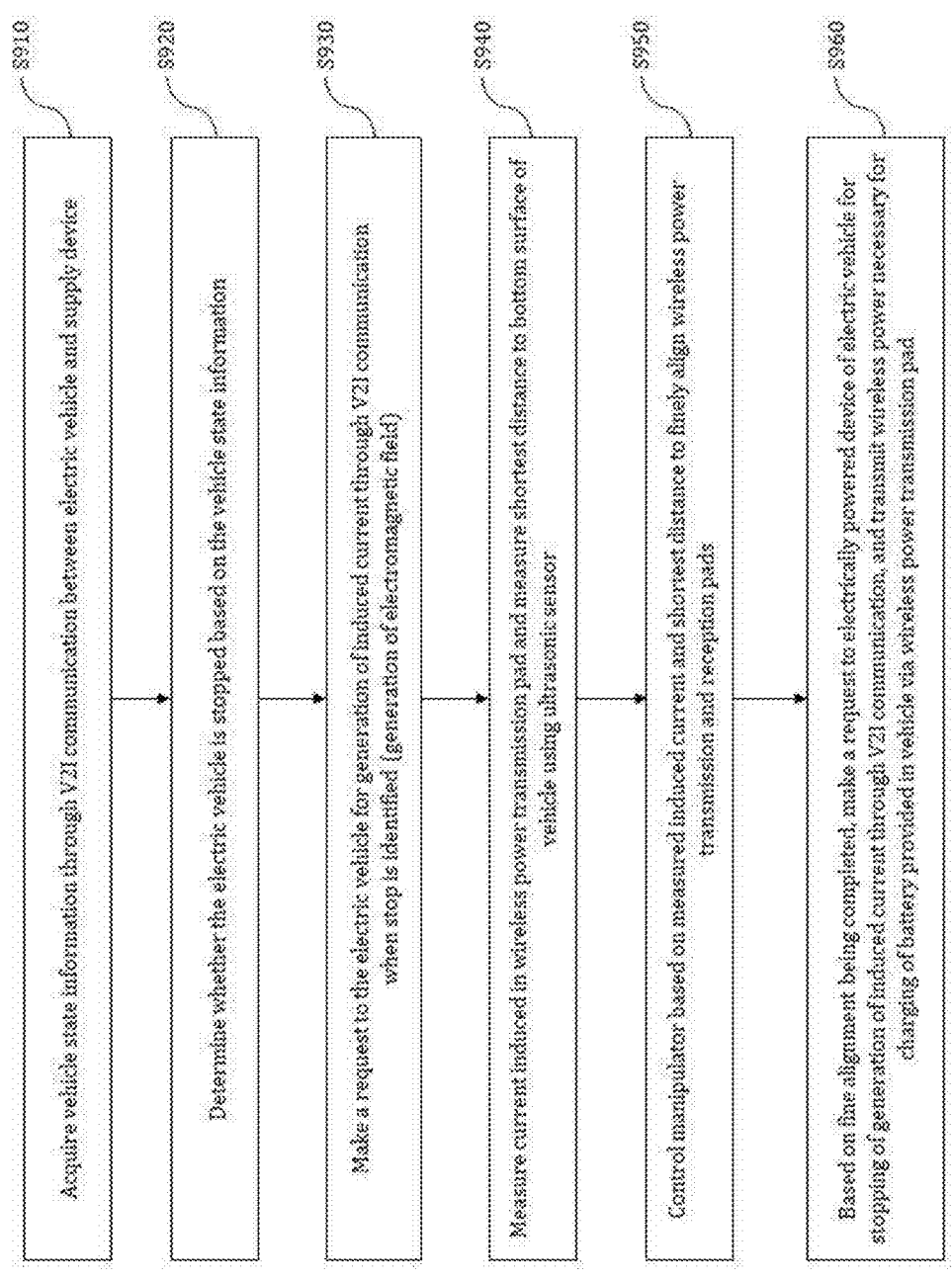

S910 Acquire vehicle state information through V2I communication between electric vehicle and supply device S920 Determine whether the electric vehicle is stopped based on the vehicle state information S930 Make a request to the electric vehicle for generation of induced current through V2I communication when stop is identified (generation of electromagnetic field)

S940 Measure current induced in wireless power transmission pad and measure shortest distance to bottom surface of vehicle using ultrasonic sensor S950 Control manipulator based on measured induced current and shortest distance to finely align wireless power transmission and reception pads S960 Based on fine alignment being completed, make a request to electrically powered device of electric vehicle for stopping of generation of induced current through V2I communication, and transmit wireless power necessary for charging of battery provided in vehicle via wireless power transmission pad.

FIG.10

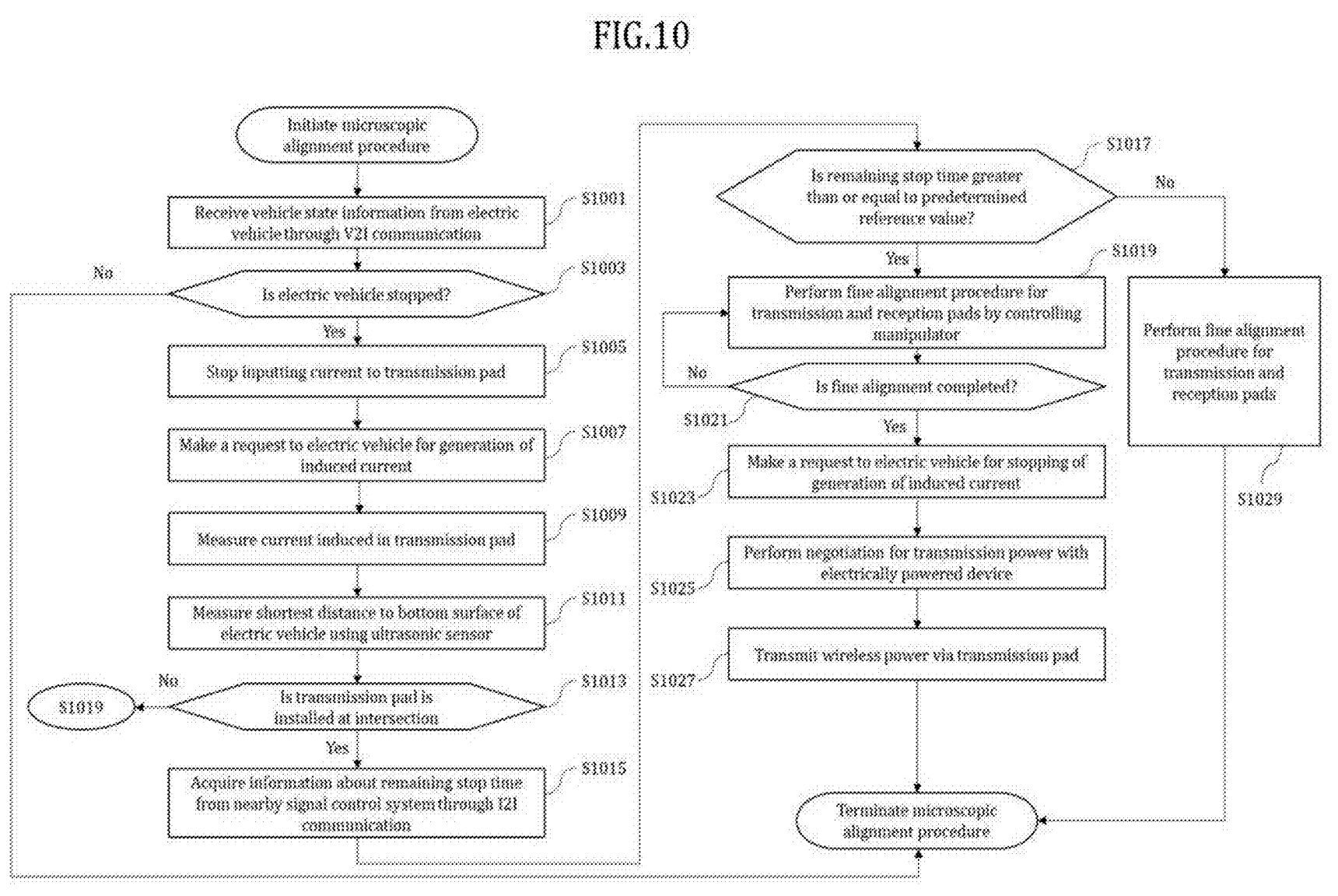

Initiate microscopic alignment procedure

Receive vehicle state information from electric vehicle through V2I communication — S1001

Is electric vehicle stopped? — S1003

Stop inputting current to transmission pad — S1005

Make a request to electric vehicle for generation of induced current — S1007

Measure current induced in transmission pad — S1009

Measure shortest distance to bottom surface of electric vehicle using ultrasonic sensor — S1011

Is transmission pad is installed at intersection — S1013

Acquire information about remaining stop time from nearby signal control system through V2I communication — S1015

S1019

Is remaining stop time greater than or equal to predetermined reference value? — S1017

Perform fine alignment procedure for transmission and reception pads by controlling manipulator — S1019

Is fine alignment completed? — S1021

Make a request to electric vehicle for stopping of generation of induced current — S1023

Perform negotiation for transmission power with electrically powered device — S1025

Transmit wireless power via transmission pad — S1027

Perform fine alignment procedure for transmission and reception pads — S1029

Terminate microscopic alignment procedure

FIG.11

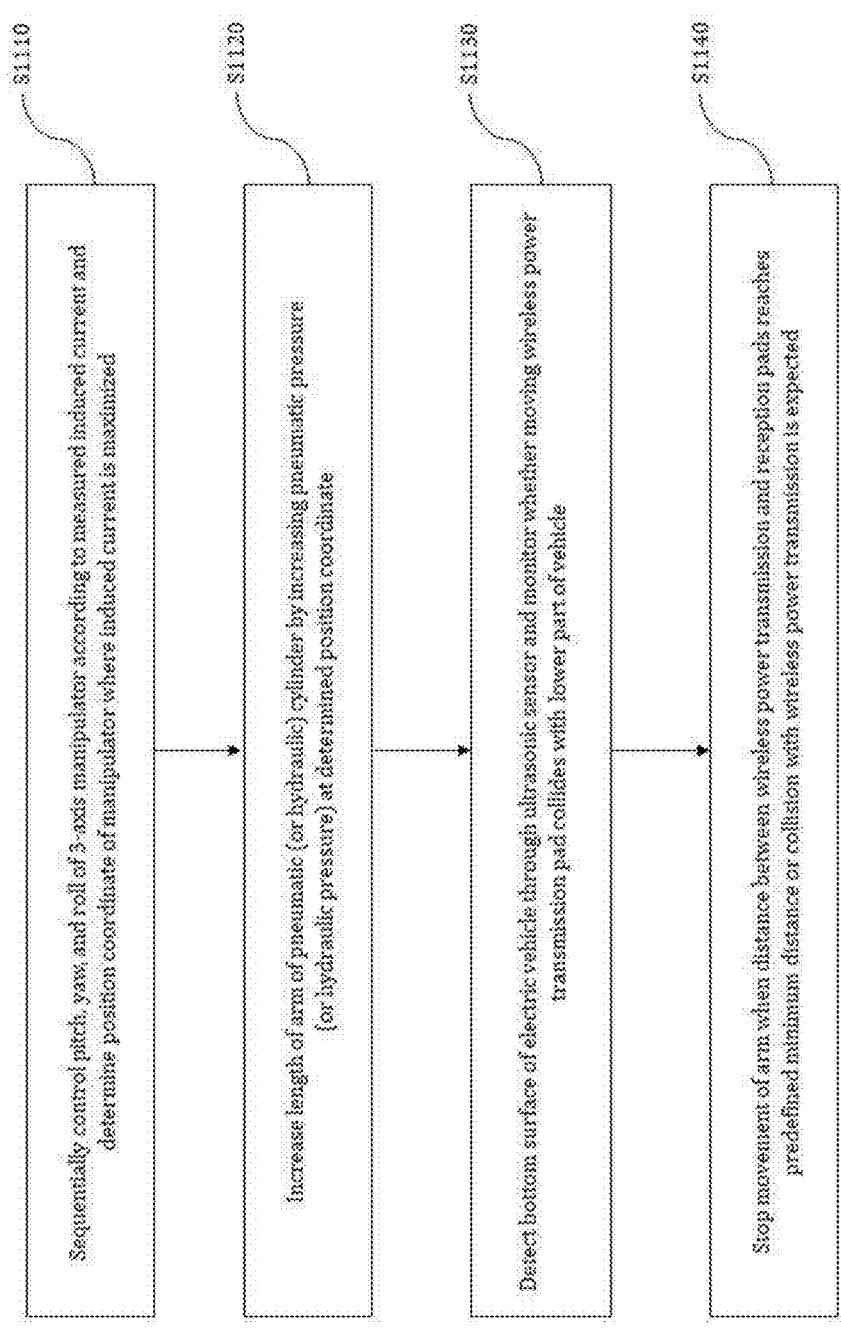

S1110

Sequentially control pitch, yaw, and roll of 3-axis manipulator according to measured induced current and determine position coordinate of manipulator where induced current is maximized

S1120

Increase length of arm of pneumatic (or hydraulic) cylinder by increasing pneumatic pressure (or hydraulic pressure) at determined position coordinate

S1130

Detect bottom surface of electric vehicle through ultrasonic sensor and monitor whether moving wireless power transmission pad collides with lower part of vehicle

S1140

Stop movement of arm when distance between wireless power transmission and reception pads reaches predefined minimum distance or collision with wireless power transmission is expected

MICROSCOPIC ALIGNMENT METHOD FOR WIRELESS CHARGING OF ELECTRIC VEHICLE AND APPARATUS AND SYSTEM THEREFOR

CROSS-REFERENCE TO RELATED APPLICATION

This application claims the benefit of Korean Patent Application No. 10-2021-0188605, filed on Dec. 27, 2021, which is hereby incorporated by reference as if fully set forth herein.

BACKGROUND

Field of the Invention

The present disclosure relates to wireless charging technology for electric vehicles, and more particularly, to a technology for wireless charging of an electric vehicle by microscopically aligning the electric vehicle equipped with a wireless power receiver for wireless charging with a wireless power transmitter installed at the center of a lane while the vehicle is stopped.

Discussion of the Related Art

As the spread of electric vehicles is invigorated, interest in electric vehicle charging and demand for charging facilities are increasing. In the current electric vehicle charging system, electric vehicles are charged by connecting a dedicated charging plug provided at a separate charging station or in a house/parking lot to the electric vehicles.

However, charging an electric vehicle takes more time than a general refueling method, and there are difficulties in charging because sufficient charging stations have not been secured.

Accordingly, recently, interest in wireless charging of electric vehicles as an alternative to the existing charging stations is increasing.

According to the method of wireless charging of electric vehicles, when a vehicle equipped with a wireless charging reception pad is placed on a wireless power transmission pad buried in the ground and current is applied to the wireless power transmission pad, electric energy is transmitted to the wireless charging reception pad of the vehicle through electromagnetic induction or electromagnetic resonance to charge the battery provided in the vehicle.

The wireless electric vehicle charging method is not only friendly to the city landscape, but also has an advantage of requiring smaller space than the traditional plug-based charging method.

With a wireless power transmission pad installed before the stop line at the intersection to wirelessly charge an electric vehicle that stops and waits for a signal, the driver may not need to either much worry about the mileage or spend extra time to charge the electric vehicle.

The power transmission efficiency of the wireless charging system is determined by the degree of alignment of the wireless power transmission pad and the wireless power reception pad.

In general, in the case of wireless charging of a small electronic device such as a smartphone, the influence of the degree of alignment of the transmission and reception coils on the wireless charging efficiency may be minimized by increasing the size of the wireless power transmission pad. In addition, in the case of wireless charging of a small electronic device such as a smartphone, the transmission and reception coils may be accurately aligned by providing a separate alignment means such as an electromagnet.

However, in the case of an electric vehicle, greatly increasing the size of the wireless power transmission pad may raise a cost related issue and cause excessive power consumption.

In general, the wireless power reception pad of an electric vehicle is mounted on one side of a lower part of the vehicle, and thus it is difficult for a driver to visually check and align the wireless power transmission and reception pads.

In addition, it is difficult in reality for a driver to fine-tune an electric vehicle by several centimeters to increase wireless charging efficiency, and power transmission efficiency may be lowered due to an alignment error, resulting in waste of power and excessive charging time.

In addition, the location of the wireless power reception pad mounted on the electric vehicle may differ among vehicle manufacturers and among vehicle models. Accordingly, in order to increase the wireless charging efficiency, there is a need for a method for automatically aligning the wireless power transmission and reception pads at the correct position while the vehicle is stopped.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An object of the present disclosure is to provide a method for performing wireless charging by automatically aligning a wireless power transmitter and receiver during a stop, and an apparatus and system for the same.

Another object of the present invention is to provide a microscopic alignment method for wireless charging of an electric vehicle capable of automatically aligning wireless power transmission and reception pads by finely adjusting the positions of the wireless power transmission and reception pads using a mechanical device while the vehicle is stopped, and an apparatus for the same.

Another object of the present invention is to provide a microscopic alignment method for wireless charging of an electric vehicle capable of minimizing an alignment error between the wireless power transmission and reception pads during a stop without a separate intervention of a driver by providing a wireless power transmission pad capable of making a 3-axis movement through a manipulator structure employing a pneumatic cylinder, an apparatus for the same.

Another object of the present disclosure is to provide a wireless charging method for an electric vehicle capable of minimizing power waste and user inconvenience by automatically and optimally aligning wireless power transmission and reception pads while the electric vehicle is stopped, and an apparatus and system for the same.

Another object of the present invention is to provide a wireless charging method for an electric vehicle capable of preventing a collision between wireless power transmission and reception pads in aligning the pads through surface detection using a laser sensor or the like, and an apparatus and system for the same.

Another object of the present invention is to provide a wireless charging method for an electric vehicle capable of maximizing wireless charging efficiency by finely aligning a wireless power transmission pad such that the amount of current induced in a wireless power reception pad is maximized through cooperation between an electrically powered device of the electric vehicle and a supply device, and an apparatus and system for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

In one general aspect, a microscopic alignment method for wirelessly charging an electric vehicle by a supply device includes determining whether the electric vehicle is stopped, based on the electric vehicle being stopped, making a request to the electric vehicle for generation of an induced current, measuring the induced current received through a wireless power transmission pad, performing fine alignment of the wireless power transmission pad based on the induced current, and based on the fine alignment being completed, transmitting wireless power via the wireless power transmission pad.

The method may include acquiring vehicle state information about the electric vehicle through vehicle-to-infrastructure (V2I) communication, wherein whether the electric vehicle is stopped may be determined based on the vehicle state information.

Performing the fine alignment may include controlling a manipulator according to the induced current and determining a position coordinate value at which the induced current is maximized, and controlling a pneumatic cylinder of the manipulator based on the position coordinate value and moving the wireless power transmission pad closer to a wireless power reception pad of the electric vehicle.

The method may include driving a plurality of ultrasonic sensors disposed in the wireless power transmission pad in a time division manner, and measuring a minimum distance to a bottom surface of the electric vehicle using the ultrasonic sensors, and the wireless power transmission pad may be moved closer to the wireless power reception pad of the electric vehicle further based on the minimum distance.

Measuring the minimum distance to the bottom surface of the electric vehicle may include measuring a round trip time (RTT) of an ultrasound signal, and measuring the minimum distance based on one or more of the RTT and a distance between the ultrasonic sensors.

The manipulator may be a three-axis manipulator having four degrees of freedom configured to sequentially perform pitch, yaw, and roll motions.

The method may include acquiring information about a mounting location of the wireless power transmission pad, and, based on the wireless power transmission pad being mounted at an intersection, information about a remaining stop time may be acquired from a signal control system through infrastructure-to-infrastructure (I2I) communication.

Based on the remaining stop time being greater than or equal to a reference value, the fine alignment of the wireless power transmission pad may be performed, and, based on the remaining stop time being less than the reference value, the fine alignment may be skipped.

The method may include, based on the fine alignment being completed, making a request to the electric vehicle for stopping the generation of the induced current, determining transmission power through negotiation for power with an electrically powered device of the electric vehicle, and transmitting the transmission power via the wireless power transmission pad.

In another general aspect, a non-volatile computer-readable storage medium storing at least one computer program including instructions that, when executed by at least one processor, cause a supply device provided with the at least one processor to perform alignment operations for wireless charging of an electric vehicle. The operations include determining whether the electric vehicle is stopped, based on the electric vehicle being stopped, making a request to the electric vehicle for generation of an induced current, measuring the induced current received through a wireless power transmission pad, performing fine alignment of the wireless power transmission pad based on the induced current, and based on the fine alignment being completed, transmitting wireless power via the wireless power transmission pad.

In another general aspect, a supply device includes a wireless power transmission pad configured to wirelessly transmit an alternating current (AC) power, a power conversion system configured to convert an externally supplied power into the AC power, a manipulator configured to adjust a position of the wireless power transmission pad, and a control communication unit configured to determine whether an electric vehicle is stopped, based on the electric vehicle being stopped, make a request to the electric vehicle for generation of an induced current, measuring the induced current received through the wireless power transmission pad, control the manipulator based on the induced current to perform fine alignment of the wireless power transmission pad, and based on the fine alignment being completed, control the power conversion system to transmit wireless power via the wireless power transmission pad.

The control communication unit may acquire vehicle state information about the electric vehicle through vehicle-to-infrastructure (V2I) communication, and may determine whether the electric vehicle is stopped based on the vehicle state information.

The control communication unit may control the manipulator according to the induced current to determine a position coordinate value at which the measured induced current is maximized, and may control a pneumatic cylinder of the manipulator based on the position coordinate value to move the wireless power transmission pad closer to a wireless power reception pad of the electric vehicle.

The supply device may include a plurality of ultrasonic sensors disposed on one side of the wireless power transmission pad, and the control communication unit may drive the plurality of ultrasonic sensors in a time division manner to measure a minimum distance to a bottom surface of the electric vehicle using the driven ultrasonic sensors, and may control the manipulator based on the minimum distance to move the wireless power transmission pad closer to the wireless power reception pad of the electric vehicle.

The control communication unit may measure a round trip time (RTT) of an ultrasound signal, and may measure the minimum distance based on one or both of the RTT and a distance between the ultrasonic sensors.

The manipulator may be a three-axis manipulator having four degrees of freedom configured to sequentially perform pitch, yaw, and roll motions.

Based on the wireless power transmission pad being mounted at an intersection, the control communication unit may acquire information about a remaining stop time from a signal control system through infrastructure-to-infrastructure (I2I) communication.

Based on the remaining stop time being greater than or equal to a reference value, the control communication unit may perform the fine alignment of the wireless power transmission pad, and, based on the remaining stop time being less than the reference value, the control communication unit may perform a control operation to skip the fine alignment.

The control communication unit may be configured to, based on the fine alignment being completed, make a request to the electric vehicle for stopping the generation of the induced current, determine transmission power through negotiation for power with an electrically powered device of the electric vehicle, and control the power conversion system according to the transmission power to generate the AC power.

In another aspect of the present disclosure, a wireless charging system may include an electric vehicle including an electrically powered device configured to receive wireless power via a wireless power reception pad, and a supply device configured to determine whether the electric vehicle is stopped, based on the electric vehicle being stopped, make a request to the electric vehicle for generation of an induced current, measure the induced current received through a wireless power transmission pad, perform fine alignment of the wireless power transmission pad based on the measured induced current, and based on the fine alignment being completed, transmitting wireless power via the wireless power transmission pad.

The above-described aspects of the present disclosure are merely some of the preferred embodiments of the present disclosure, and various embodiments reflecting the technical features of the present disclosure may be derived and understood by those skilled in the art based on the following detailed description of the disclosure.

As is apparent from the above description, the present disclosure may provide a method for automatically aligning a wireless power receiver with a wireless power transmitter for wireless charging while a vehicle is stopped, and an apparatus and system for the same.

In addition, the present disclosure may provide a microscopic alignment method for wireless charging of an electric vehicle capable of automatically aligning wireless power transmission and reception pads by finely adjusting the position of the wireless power transmission pad using a mechanical device provided in a supply device while the vehicle is stopped, and an apparatus for the same.

In addition, the present disclosure may provide a microscopic alignment method for wireless charging of an electric vehicle capable of minimizing an alignment error between the wireless power transmission and reception pads during a stop without a separate intervention of a driver by providing a wireless power transmission pad capable of making a 3-axis movement through a manipulator structure employing a pneumatic cylinder, an apparatus for the same.

In addition, the present disclosure may provide a wireless charging method for an electric vehicle capable of minimizing power waste and user inconvenience by automatically and optimally aligning wireless power transmission and reception pads while the electric vehicle is stopped, and an apparatus and system for the same.

In addition, the present disclosure may provide an electric vehicle wireless charging system having enhanced durability by preventing a collision between wireless power transmission and reception pads in aligning the pads through surface detection using a laser sensor or the like.

In addition, the present disclosure may provide a wireless charging method for an electric vehicle capable of maximizing wireless charging efficiency by automatically and finely aligning a wireless power transmission pad such that the amount of current induced in a wireless power reception pad is maximized through cooperation between an electrically powered device provided in the electric vehicle and a supply device through wireless communication, and an apparatus and system for the same.

In addition, various effects that can be directly or indirectly identified through this document may be provided.

Other features and aspects will be apparent from the following detailed description, the drawings, and the claims.

BRIEF DESCRIPTION OF THE DRAWINGS

The accompanying drawings, which are included to provide a further understanding of the disclosure, provide various embodiments of the present disclosure and illustrate principles of the present disclosure together with detail explanation.

FIG. 2 is a diagram illustrating a detailed structure of an electric vehicle wireless charging system according to an embodiment.

FIG. 5 is a flowchart illustrating a method for macroscopically aligning wireless power transmission and reception pads by a supply device during driving of an electric vehicle according to an embodiment.

FIG. 7 specifically illustrates a macroscopic alignment procedure for wireless charging of the electric vehicle according to an embodiment.

FIG. 9 is a flowchart illustrating a method for microscopic alignment of wireless power transmission and reception pads for wireless charging by a supply device according to an embodiment.

FIG. 10 is a flowchart illustrating a method for microscopic alignment of wireless power transmission and reception pads for wireless charging by a supply device to another embodiment.

FIG. 11 is a flowchart illustrating a procedure for fine alignment of wireless power transmission and reception pads using a manipulator according to an embodiment.

DETAILED DESCRIPTION

Figure 1:
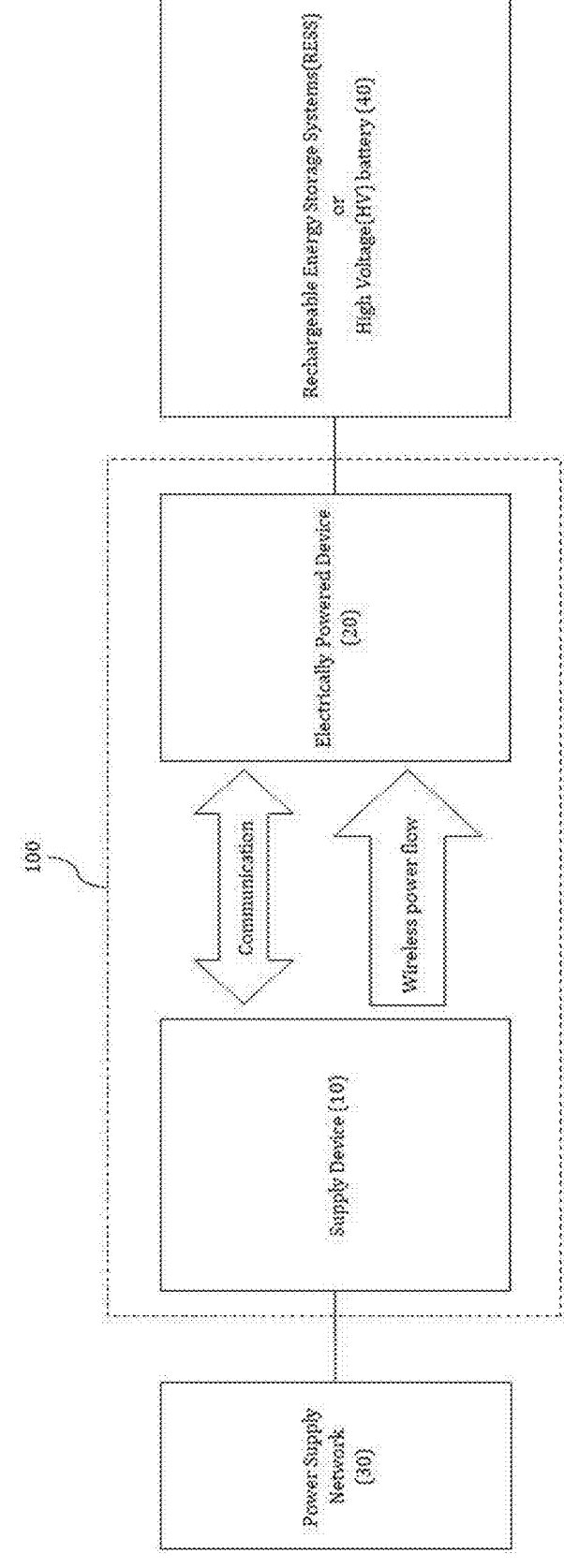
FIG. 1 is a diagram illustrating the overall structure of a wireless power transmission system according to an embodiment.

Hereinafter, some embodiments of the present disclosure will be described in detail with reference to the accompanying drawings. It should be noted that, in adding reference numerals to the constituent elements in the respective drawings, like reference numerals will be used throughout the drawings to refer to the same or like elements. Further, in the following description of embodiments of the present disclosure, a detailed description of known functions and configurations incorporated herein will be omitted to avoid obscuring the subject matter of the embodiments.

In describing the components of the embodiments of the present disclosure, various terms such as first, second, A, B, (a), (b), etc., may be used solely for the purpose of differentiating one component from another, but the essence, order or sequence of the components are not limited to these terms. Unless defined otherwise, all terms, including technical and scientific terms, used in the present disclosure may have the same meaning as commonly understood by a person having ordinary skill in the art to which the present disclosure pertains. It will be further understood that terms, such as those defined in commonly used dictionaries, may be interpreted as having a meaning that is consistent with their meaning in the context of the related art and the present disclosure, and may not be interpreted in an idealized or overly formal sense unless expressly so defined herein.

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Hereinafter, embodiments of the present disclosure will be described in detail with reference to FIGS. 1 to 13.

FIG. 1 is a diagram illustrating the overall structure of a wireless power transmission system according to an embodiment.

Referring to FIG. 1, a wireless power transmission system 100 may include a supply device 10 and an electrically powered device 20.

The supply device 10 may convert AC (or DC) electrical energy supplied from a power supply network 30 into AC electrical energy required by the electrically powered device 20, and then transmit the converted AC electrical energy to the electrically powered device 20 using a predetermined wireless energy transmission method. Here, the wireless energy transmission method may include electromagnetic induction, electromagnetic resonance (or magnetic resonance), microwaves, and radio frequency (RF) wireless power transmission. The electromagnetic induction is a method of transferring energy using an induced electromotive force generated by a magnetic induction of AC power between the primary coil provided in the supply device 10 and the secondary coil provided in the electrically powered device 20. On the other hand, in the method of electromagnetic resonance, when a magnetic field that vibrates at a specific resonant frequency is generated through the primary coil provided in the supply device 10, the electrically powered device 20 induces a magnetic field in the secondary coil having the same resonant frequency to transfer energy. The RF wireless power transmission is a method of transmitting an RF wireless power signal to the receiver through beamforming using a phased array antenna system of the transmitter. This method may allow remote wireless charging up to a radius of several meters, compared to the conventional electromagnetic induction or electromagnetic resonance.

The supply device 10 and the electrically powered device 20 may be interconnected through short-range wireless communication to exchange various kinds of information for wireless power transmission.

The electrically powered device 20 may rectify the wireless power received from the supply device 10 and then supply the rectified power to the in-device—that is, onboard—rechargeable energy storage systems (RESS) or high voltage (HV) battery.

The supply device 10 according to the embodiment may be installed in a building, a road, a parking lot, a charging hub, or a vertiport, which is infrastructure for takeoff and landing of urban air mobility located on land, in the air, on water or on the roof of a building. When a wireless power transmission pad for wireless power transmission is mounted on the electrically powered device 20, the electrically powered device 20 may perform a function as a supply device. Thereby, wireless charging may be performed between the electrically powered devices 20.

For example, when the electrically powered device 20 is equipped with multiple wireless power reception pads, the electrically powered device 20 may receive wireless power from other multiple electrically powered devices 20 equipped with a wireless power transmission pad at the same time to charge the battery.

As another example, when the electrically powered device 20 is equipped with multiple wireless power transmission pads, the electrically powered device 20 may transmit wireless power to other multiple electrically powered devices 20 equipped with a wireless power reception pad to charge the multiple electrically powered devices 20 at the same time. That is, when the electrically powered device 20 is unable to move to the supply device 10 due to the current battery charge amount, it may be operatively connected to another nearby electrically powered device 20 to perform charging between the electrically powered devices 20. As an example, an electrically powered device to supply wireless power and an electrically powered device to receive the wireless power may be dynamically determined based on the current battery charge amount of the electrically powered device 20.

The electrically powered device 20 according to the embodiment may be mounted on various means of transportation. As an example, the electrically powered device 20 may be applied to an electric vehicle, an unmanned drone, urban air mobility, multi-modal mobility (or hybrid air mobility) operating on land and in the air or on land and at sea.

The electrically powered device 20 according to the embodiment may be mounted on one side of a lower part of the vehicle. However, this is merely one embodiment. The electrically powered device may be mounted on one side of the front/rear bumper of the vehicle, one side of the left/right side mirror of the vehicle, or one side of an upper part of the vehicle according to the design by those skilled in the art.

The supply device 10 according to the embodiment may be operatively connected to other supply devices by a wired or wireless communication system.

The electrically powered device 20 according to the embodiment may be operatively connected to an electrically powered device (not shown) mounted on another vehicle by a wireless communication system. To this end, the electrically powered device 20 may be connected to a vehicle terminal (not shown) over an in-vehicle communication network. For example, the wireless communication system may be a multiple access system that supports communication with multiple users by sharing an available system resource (e.g., bandwidth, transmit power, etc.). Examples of the multiple access system may include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

The electrically powered device 20 according to the embodiment may be connected to another supply device by wireless communication. As an example, the electrically powered device 20 may be connected to multiple supply devices 10. In this case, the electrically powered device 20 may receive wireless power from the supply devices 10 simultaneously. Based on the wireless charging efficiency between the electrically powered device 20 and the supply devices 10, the electrically powered device 20 may dynamically determine at least one supply device 10 to receive power.

In the above-described embodiment, it has been described that the supply device 10 and the electrically powered device 20 to perform wireless charging are dynamically determined based on the wireless charging efficiency. However, this is merely one embodiment. The supply device 10 and the electrically powered device 20 to perform wireless charging may be dynamically determined by further considering the type and capability of the supply device 10, the type and capability of the electrically powered device 20, and the like. As an example, the type and capability of the electrically powered device 20 may depend on the type of the transportation means on which the electrically powered device 20 is mounted. Accordingly, the type and capability of the supply device 10 matching the electrically powered device 20 may depend on the electrically powered device 20.

The electrically powered device 20 according to the embodiment may serve as a power relay to transmit power received from the supply device 10 to an electrically powered device of another vehicle. In this case, the electrically powered device 20 may include both a wireless power receiver configured to receive wireless power and a wireless power transmitter configured to transmit wireless power. The wireless power receiver and the wireless power transmitter may be mounted at positions in the vehicle, but this is merely an example. The wireless power receiver and wireless power transmitter may be configured as one module and mounted at the same position. As an example, a wireless power receiver to receive power from the supply device 10 may be disposed on one side of the lower part of the vehicle, and a wireless power receiver to receive power from a wireless power transmitter of another vehicle may be disposed at the center of the front bumper of the vehicle. Also, a wireless power transmitter to wirelessly transmit power to another vehicle may be disposed at the center of the rear bumper of the vehicle. As another example, an integrated module implemented to enable wireless power transmission and reception (hereinafter, referred to as an "integrated transceiver" for simplicity) may be disposed on one side of a side mirror of the vehicle, and a wireless power receiver to receive power from the supply device 10 may be disposed on one side of the lower part (or upper part) of the vehicle. As another example, a wireless power receiver to receive power from the supply device 10 may be disposed on one side of the lower part (or upper part) of the vehicle, and a wireless power receiver to receive power from another vehicle in front of the vehicle may be disposed at the center of the front bumper of the vehicle. Also, a wireless power transmitter to transmit power to another vehicle behind the vehicle may be disposed at the center of the rear bumper of the vehicle, and an integrated transceiver may be disposed on one side of the left/right side mirror of the vehicle.

According to the above-described embodiments, a vehicle equipped with the electrically powered device 20 according to the present disclosure may be implemented to flexibly configure a longitudinal and/or lateral wireless charging chain.

The electrically powered device 20 may control at least one switch corresponding to the wireless power transmitter and the wireless power receiver to turn on/off the operations of the wireless power transmitter and the wireless power receiver.

As an example, an electrically powered device of a first vehicle may be operatively connected to an electrically powered device provided in the second vehicle to divide wireless power received from the supply device and transmit the same to the battery thereof and the second vehicle. In this case, the amount of power by which the first vehicle and the second vehicle are to be charged may be dynamically determined based on the battery charge level of each vehicle.

The electrically powered device 20 according to the embodiment may determine whether power relay to another vehicle is allowed, based on the battery charge level of the RESS 40. For example, when the battery charge level (or battery output voltage) of the first vehicle is greater than or equal to a predetermined reference value, the electrically powered device of the first vehicle may transmit the power received from the supply device 10 to the electrically powered device 20 of the second vehicle. On the other hand, when the battery charge level (or battery charge voltage) of the first vehicle is less than the predetermined reference value, the electrically powered device of the first vehicle may control the power received from the supply device not to be relayed to the electrically powered device of the second vehicle.

A vehicle terminal mounted on an electric vehicle may be connected to the supply device 10, another vehicle terminal, and/or a base stations, and/or a road side unit (RSU) through V2X (vehicle to everything) communication to exchange various kinds of information.

V2X refers to a communication technology for exchanging information with other vehicles, pedestrians, and infrastructure-built objects through wired/wireless communication. V2X may be divided into four types: vehicle-to-vehicle (V2V) for vehicle-to-vehicle communication; vehicle-to-infrastructure (V2I) for communication between a vehicle and infrastructure; vehicle-to-network (V2N) for communication between a vehicle and a communication network; and vehicle-to-pedestrian (V2P) for communication between a vehicle and a pedestrian. V2X communication may be provided via a PC5 interface and/or a Uu interface.

In addition, the supply device according to the embodiment may communicate with a peripheral signal system and/or an RSU through infrastructure-to-infrastructure (I2I) communication.

The electric vehicle according to the embodiment may communicate with the supply device 10 through V2X communication.

Sidelink (SL) is a communication scheme that establishes a direct wireless link between vehicle terminals to enable direct exchange of information between the vehicle terminals without intervention of a base station (BS) or infrastructure (for example, RSU). SL is considered as a way to alleviate the burden on the BS according to the rapidly increasing amount of data traffic and to minimize the transmission delay in vehicle-to-vehicle communication.

FIG. 2 is a diagram illustrating the electric vehicle wireless charging system according to the embodiment.

Referring to FIG. 2, a wireless charging system 200 for an electric vehicle may include a supply device 10, a power supply network 30, and an electric vehicle 201.

In the embodiment of FIG. 2, wireless charging for one electric vehicle 201 is described as an example. However, this is merely an embodiment. There may be two or more electric vehicles 201 that may be charged simultaneously by the supply device 10. The maximum number of electric vehicles that may be charged simultaneously according to one supply device 10 may be dynamically determined by the maximum suppliable power of the supply device 10, the required power of the electric vehicles to be charged, and the like. The supply device 10 according to the embodiment may be provided with multiple wireless power transmission pads for wirelessly transmitting power to multiple electric vehicles.

The supply device 10 may include, but is not limited to, a wireless power transmission pad 11, a power conversion system 12, and a control communication unit 13. The supply device 10 may further include a positioning system (GPS) receiver (not shown), an ultrasonic sensor (not shown), and a manipulator (not shown).

The control communication unit 13 may control the overall operation and input/output of the supply device 10. Also, the control communication unit 13 may control the power conversion system 12 to convert power provided from the power supply network 30 into power required for charging of the electric vehicle 201. In this case, an AC power signal converted by the power conversion system 12 may be wirelessly transmitted through a transmission coil provided in the wireless power transmission pad 11. The wireless power generated through the wireless power transmission pad 11 as output may be induced in the reception coil of a wireless power reception pad 213 through electromagnetic induction (or electromagnetic resonance) and thus received by the electric vehicle 201.

In an embodiment, multiple wireless power transmission pads 11 may be provided in the supply device 10 so as to charge multiple electric vehicles simultaneously. However, this is merely one embodiment. Multiple transmission coils may be provided in one wireless power transmission pad 11 to charge multiple electric vehicles simultaneously.

The supply device 10 may further include a GPS receiver (not shown) and an ultrasonic sensor. The supply device 10 may provide the electric vehicle 201 with GPS coordinate information about the supply device 10 and offset information about the wireless power transmission pad 11. Here, the offset information may include information on the separation distance from the center line of the road on which the wireless power transmission pad 11 is mounted to the center line of the wireless power transmission pad 11. In addition, the supply device 10 may receive sensor state information related to the electric vehicle 201, and may adaptively drive the ultrasonic sensor based on the sensor state information related to the electric vehicle 201. In this case, the electric vehicle 201 may detect an ultrasonic signal generated by the supply device 10 as output and identify the location of the supply device 10 or the location of the wireless power transmission pad 11. Then, the electric vehicle 201 may move to the identified location and align the wireless power transmission and reception pads in place. Then, wireless charging may be performed.

The supply device 10 may make a request to an electric vehicle 201 for generation of an induced current. In this case, the electric vehicle 201 may control an electrically powered device 210 to generate an induced current of a predetermined intensity through the wireless power reception pad 213. The induced current generated through the wireless power reception pad 213 may be received by the wireless power transmission pad 11 of the supply device 10. The supply device 10 may measure the induced current on the wireless power transmission pad 11, and control the manipulator provided with the wireless power transmission pad 11 to maximize the measured intensity of the induced current to perform fine alignment of the wireless power transmission and reception pads.

In addition, in an embodiment, the supply device 10 may measure the minimum distance to the bottom surface of the vehicle using the ultrasonic sensor provided in the wireless power transmission pad 11, and control the manipulator based on the measured minimum distance to perform fine alignment of the wireless power transmission and reception pads.

Referring to FIG. 2, the electric vehicle 201 may include at least one of an electrically powered device 210, a communication terminal 220, a RESS 230, a sensor 240, a GPS receiver 250, a navigation system 260, or electric control units (ECUs) 270. Here, the sensor 240 may include at least one of a camera 241, an ultrasonic sensor 242, a radar 243, or a Light Detection and Ranging (LiDAR) 244. For example, the camera 241 may include at least one of a front camera, a rear camera, a left/right side camera, an upper camera, a lower camera, or a surround view monitor (SVM) camera. As an example, the camera 241 may further include at least one of an RGB camera and an infrared camera.

The electrically powered device 210 may include a control communication unit 211, a power conversion unit 212, and a wireless power reception pad 213.

The control communication unit 211 may control input/output and overall operation of the electrically powered device, and may perform communication with external device(s). As an example, the external devices may include the supply device 10 as well as devices mounted in the electric vehicle 201 such as, for example, the communication terminal 220, the sensor 240, the GPS receiver 250, the navigation system 260, and the ECUs 270.

The control communication unit 211 may communicate with various ECUs over an internal communication network of the electric vehicle 201. Here, the ECUs may include, but are not limited to, a steering system for steering control, a braking system for controlling stopping and parking, and a drive motor system for driving. The internal communication network of the electric vehicle 201 may include, but is not limited to, a controller area network (CAN), a local interconnect network (LIN), a FlexRay, and a media oriented systems transport (MOST) communication network.

The control communication unit 211 may exchange various kinds of control signals and state information with the control communication unit 13 of the supply device 10 through in-band (or out-of-band) communication for wireless power reception. Here, the in-band communication refers to a scheme of communication using the same frequency band as a frequency band used for wireless power transmission. As an example, the out-of-band communication may include, but is not limited to, IEEE 802.11p communication, 4G LTE communication, and 5G New Radio (NR) mmWave communication. According to the design by those skilled in the art, Bluetooth communication, radio frequency identification (RFID) communication, near field communication (NFC), infrared (IR)-dedicated short range communications (DSRC), or optical wireless communication (OWC) may be used.

Also, the control communication unit 211 may be directly/indirectly connected to a communication terminal of another electric vehicle via the communication terminal 220 to exchange information.

The supply device 10 may also be equipped with a separate communication terminal (not shown). In this case, the control communication unit 211 may exchange various kinds of control signals and state information with the communication terminal (not shown) of the supply device 10 via the communication terminal 220.

The control communication unit 211 may exchange various kinds of control signals and state information with a user device (including, for example, a smartphone and a smart key) via the communication terminal 220. To this end, the communication terminal 220 may be equipped with a Bluetooth communication function for communication with a smartphone and a frequency communication function for communication with a smart key. Here, the frequency communication function may include a function of receiving an RF radio wave of 433.92 MHz from the smart key and a function of transmitting a low frequency (LF) radio wave of 125 kHz to the smart key.

In addition, the control communication unit 211 may receive a predetermined control signal notifying the presence of a wireless power transmission pad in front of the vehicle from the navigation system 260 during driving. When the control communication unit 211 detects a wireless power transmission pad in front of the vehicle according to the control signal of the navigation system 260, it may perform a procedure of macroscopic alignment of the wireless power transmission and reception pad. Here, the macroscopic alignment procedure may include operations of estimation of a longitudinal position, control of a lateral position, fine lateral control, and fine longitudinal control. Each operation in the macroscopic alignment procedure will be specified through the description of the drawings given below.

The supply device 10 and the electrically powered device 210 of the electric vehicle 201 may transmit/receive various kinds of state information and control signals through wireless communication.

As an example, transmitter state information transmitted from the supply device 10 to the electrically powered device 210 of the electric vehicle 201 may include transmitter identification information, information about the maximum transmit power, information about the supportable power category, information about the maximum number of devices that can charged simultaneous, information about the types of supportable electrically powered devices, software version information, firmware version information, communication protocol version information, IP address information, MAC address information, port number information, and authentication and security information.

As an example, receiver state information transmitted from the electrically powered device 210 of the electric vehicle 201 to the supply device 10 may include, but is limited to, receiver identification information, information about required power, information about the maximum receivable power/voltage/current, and information about the battery charge level, information about the battery output voltage, software version information, firmware version information, communication protocol version information, IP address information, MAC address information, port number information, and authentication and security information. In an embodiment, the information about the battery charge level and the information about the battery output voltage may be exchanged between the electric vehicles 201 through communication between the communication terminals provided in the vehicles. However, this is merely one embodiment. In another embodiment, the information may be exchanged through communication between the electrically powered devices of the vehicles.

The control communication unit 211 may acquire information about the location of the supply device 10, that is, the location of the wireless power transmission pad 11, and/or information about the capability of the supply device 10 via the communication terminal 220.

In addition, the control communication unit 211 may acquire information about the location of other nearby electric vehicle(s) and information about the capability of the other nearby electric vehicle(s) via the communication terminal 220.

As an example, the capability information exchanged between electric vehicles may include, but is not limited to, information about whether a target electric vehicle is wirelessly chargeable, information about whether wireless charging between the electric vehicles is allowed, information about a mounting position of a wireless power transmission pad, and/or a wireless power reception pad, and/or a wireless power transmission/reception pad mounted on the target electric vehicle, information about a battery charge level, and information about whether wireless charging is in progress.

When the wireless power reception pad 213 of the electrically powered device 210 is aligned with the wireless power transmission pad 11 of the supply device 10, the control communication unit 13 of the supply device 10 may control the power conversion system 12 to convert the power supplied from the power supply network 30 into power required by the electric vehicle 201. Thereafter, the converted power may be induced in the wireless power reception pad 213 of the electric vehicle 201 through the wireless power transmission pad 11 in a manner of electromagnetic induction.

The electric vehicle 210 may estimate the distance to the wireless power transmission pad 11 based on sensing information received from the sensor 240 during driving. The electric vehicle 201 may perform a macroscopic alignment procedure by controlling the sensor 240 according to the distance to the wireless power transmission pad 11 estimated during driving.

Figure 3:
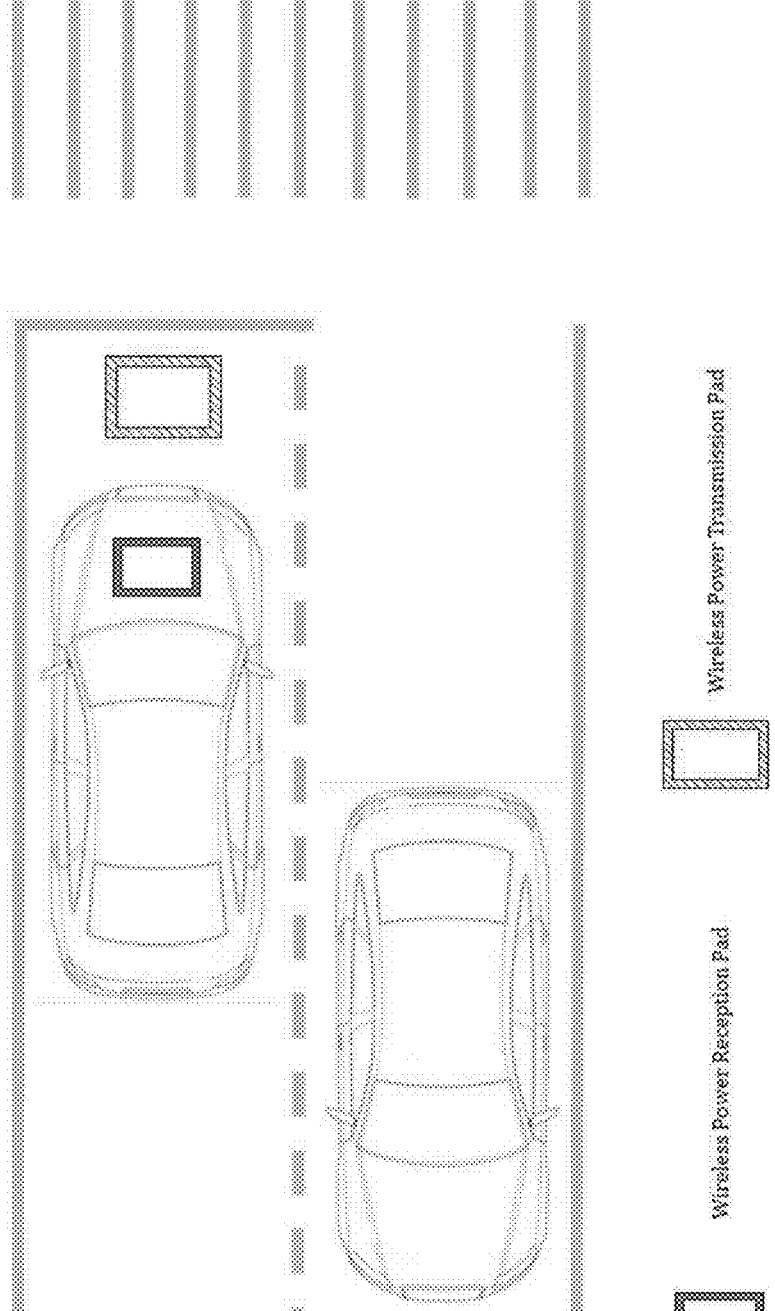
FIG. 3 is a diagram schematically illustrating a procedure of wireless charging during a stop of an electric vehicle according to an embodiment.

FIG. 3 is a diagram schematically illustrating a procedure of wireless charging during driving of an electric vehicle according to an embodiment.

Specifically, FIG. 3 illustrates a procedure in which the electric vehicle aligns the wireless power reception pad mounted on the vehicle with the wireless power transmission pad mounted on the road surface before the stop line of, for example, an intersection and/or crosswalk, during driving, and then temporarily stops to perform wireless charging.

For example, the wireless power reception pad of the electric vehicle may be mounted on one side of the lateral center of the electric vehicle. However, this is merely one embodiment. The wireless power reception pad may be mounted to have a certain offset from the lateral center according to a design by those skilled in the art.

As an example, the wireless power transmission pad may be installed on the road surface at the lateral center of the corresponding driving lane so as to be spaced a predetermined distance from the stop line of, for example, an intersection and/or a crosswalk. However, this is merely one embodiment. The wireless power transmission pad may be installed to have a certain offset from the lateral center of the driving lane according to a design by those skilled in the art.

When the electric vehicle detects a wireless power transmission pad ahead of the vehicle during driving, it may perform lateral and longitudinal position control according to the estimated distance to the wireless power reception pad to position the wireless power reception pad of the vehicle on the wireless power transmission pad.

A detailed method of macroscopically aligning the wireless power transmission and reception pads in place while the electric vehicle is driving will become clearer through the description of the drawings given below.

The electric vehicle may detect the presence of a wireless power transmission pad in front of the vehicle based on information provided from a navigation system mounted therein. When the presence of the front wireless power transmission pad is detected, the electric vehicle may estimate the distance to the wireless power transmission pad using the sensor provided in the vehicle. As an example, the electric vehicle may estimate the distance to the wireless power transmission pad using at least one of GPS coordinate information about the wireless power transmission pad, which is acquired from the navigation system, the front camera, or the LiDAR.

The electric vehicle may sequentially drive the provided sensor(s) adaptively according to the remaining distance to the wireless power transmission pad during driving to align the wireless power transmission and reception pads at the correct position.

Figure 4:
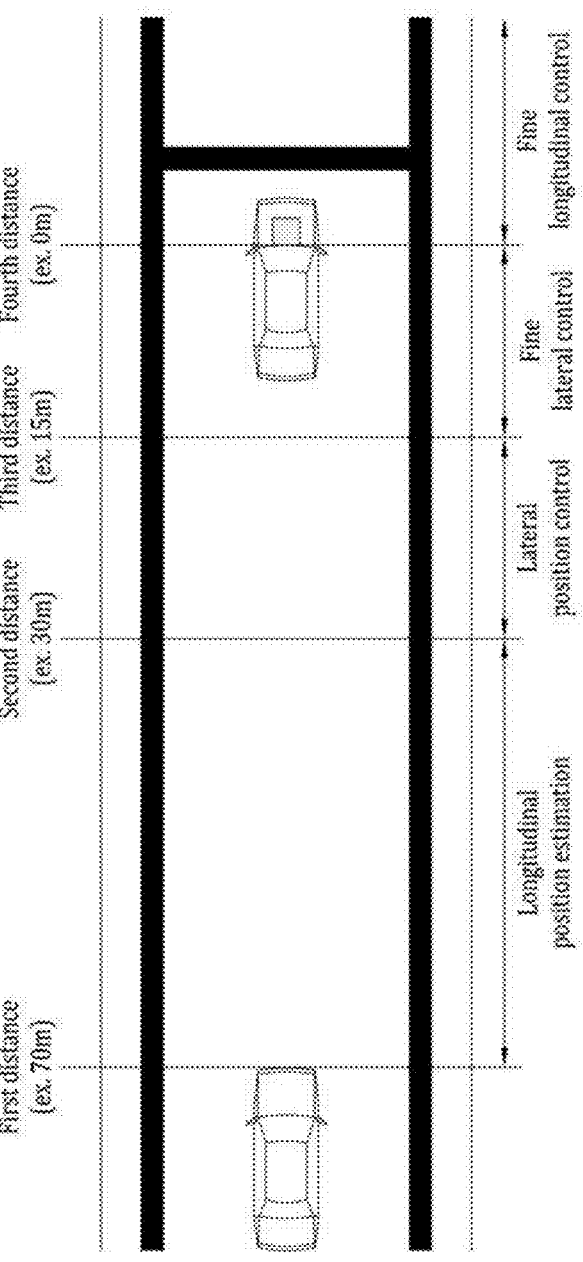
FIG. 4 is a diagram illustrating a macroscopic alignment procedure for wireless charging of an electric vehicle according to an embodiment.

FIG. 4 is a diagram illustrating a macroscopic alignment procedure for wireless charging according to an embodiment.

In detail, FIG. 4 is a diagram illustrating a procedure of macroscopically aligning the wireless power transmission and reception pads based on the remaining distance from the electric vehicle to the wireless power transmission pad during driving.

Referring to FIG. 4, when an electric vehicle detects the presence of a wireless power transmission pad in front of the vehicle based on the information provided by a navigation system during driving, the electric vehicle may estimate the remaining distance to the detected wireless power transmission pad, that is, the longitudinal position of the wireless power transmission pad by driving at least one of a LiDAR or a front camera provided therein.

For example, when the distance between the host vehicle and the wireless power transmission pad in front of the vehicle is within a first distance, the electric vehicle may detect the presence of the wireless power transmission pad according to a predetermined control signal from the navigation system. To this end, information about the mounting position of the wireless power transmission pad on the road may be pre-registered and displayed in the navigation map information. For example, the navigation system may dynamically determine the first distance based on the driving speed of the vehicle and/or the speed limit in the corresponding driving lane, but this is merely an example. The first distance may be preset to a fixed value according to a design by those skilled in the art. For example, the first distance may be set to a fixed value of 70 m.

The information about the mounting position of the wireless power transmission pad on the road provided by the navigation system according to the embodiment may include GPS coordinate information and/or information about a first offset indicating a perpendicular separation distance from the longitudinal center line of the driving road to the center of the wireless power transmission pad.

In an embodiment, the wireless power reception pad mounted in the electric vehicle may have a second offset from the lateral center of the vehicle according to the type of the vehicle.

The electric vehicle may initiate lateral position control based on the estimated longitudinal position being within a second distance. The electric vehicle may perform lateral position control in consideration of the first and second offsets described above.

When the electric vehicle is within the second distance, the electric vehicle may identify the left/right lanes using the lane cameras (e.g., left/right side-view cameras) provided therein, and determine a virtual center line of the current driving lane based on the information about the identified left/right lanes. The electric vehicle may perform the lateral position control based on the determined virtual center line and the acquired first and/or second offset information.

In an embodiment, the second distance may be dynamically set based on the driving speed of the vehicle and/or the speed limit of the corresponding driving lane. However, this is merely one embodiment. The second distance may be preset to a fixed value. For example, the second distance may be set to a fixed value of 30 m.

When the distance to the wireless power transmission pad detected through the longitudinal position estimation is within a third distance, the electric vehicle may initiate fine lateral control. When the electric vehicle is within the third distance, it may recognize the wireless power transmission pad using the SVM camera provided therein. The electric vehicle may determine a virtual center line of the wireless power transmission pad based on the recognition result. Here, the virtual center line may include at least one of a lateral center line and a longitudinal center line.

The electric vehicle may perform the fine lateral control to maintain, on the same line, the virtual center line of the wireless power transmission pad recognized using the second offset information pre-stored according to the mounted wireless power reception pad and the second offset.

In an embodiment, the third distance may be dynamically set based on the driving speed of the vehicle and/or the speed limit of the corresponding driving lane. However, this is merely one embodiment. The third distance may be preset to a fixed value. For example, the third distance may be set to a fixed value of 15 m.

After the fine lateral control is completed, the electric vehicle may perform fine longitudinal control based on the distance from the front bumper of the vehicle to the wireless power transmission pad being within a fourth distance. As an example, the electric vehicle may make a request for transmission of wireless power to the supply device for the fine longitudinal control. The electric vehicle may calculate a wireless charging efficiency and/or measure a beam pattern based on the received wireless power, and perform the fine longitudinal control based on the calculated wireless charging efficiency and/or the measured beam pattern to optimally align the wireless power transmission and reception pads.

As an example, based on the wireless charging efficiency reaching a predetermined reference value, the electric vehicle may determine that the wireless power transmission and reception pads are aligned at the correct position.

As another example, the electric vehicle may monitor the induced current while moving forward slowly, and determine that the wireless power transmission and reception pads are aligned at the correct position at a point where the amount of the induced current becomes the peak value, namely, an inflection point.

As another example, the electric vehicle may determine that the wireless power transmission and reception pads are aligned at the correct position at a point where a beam pattern measured while the vehicle moves forward slowly matches a preset optimal beam pattern to a maximum degree.

As an example, the wireless power received from the supply device during fine longitudinal alignment may be lower than the power required to charge the battery.

In an embodiment, the fourth distance may be dynamically set based on the driving speed of the vehicle and/or the speed limit of the corresponding driving lane. However, this is merely one embodiment. The fourth distance may be preset to a fixed value. For example, the fourth distance may be set to a fixed value of 0 m.

When the fine longitudinal alignment is completed, the electric vehicle may perform wireless charging by making a request for wireless power necessary for battery charging to the supply device after stopping.

As an example, the electric vehicle may communicate with the supply device through V2X communication. However, this is merely one embodiment. An electric vehicle according to another example may communicate with the supply device through in-band communication.

The electric vehicle according to the embodiment may automatically reduce the driving speed step by step according to each operation in the macroscopic alignment procedure.

As an example, the vehicle driving speed may be decelerated step by step, following the stages of longitudinal position estimation, lateral position control, fine lateral control, and fine longitudinal control in this order. For example, the electric vehicle may automatically control the driving speed to 80% of a specified speed in the longitudinal position estimation stage, 40% of the specified speed in the lateral position control stage, 10% of the specified speed in the fine lateral control stage, and 3% of the specified speed in the fine longitudinal control stage.

The electric vehicle according to the embodiment may communicate with an intersection signal system. When the intersection signal is changed from a stop signal to a driving signal during the microscopic alignment procedure, the electric vehicle may control the step-by-step driving speed control not to be performed.

In an embodiment, the electric vehicle may control the driving speed not to decelerate when the intersection signal is not a stop signal as a result of the front camera analysis after the start of the microscopic alignment procedure.

The electric vehicle according to the embodiment may receive information about a traffic light timer from the intersection signal system. In this case, the electric vehicle may determine whether to perform the microscopic alignment procedure based on the information about the traffic light timer. As an example, when the wireless charging available time at the corresponding intersection or crosswalk calculated based on the information about the traffic light timer is less than or equal to a predetermined reference value, the electric vehicle may control the microscopic alignment procedure not to be performed.

FIG. 5 is a flowchart illustrating a method for macroscopically aligning wireless power transmission and reception pads by an electric vehicle during driving according to an embodiment.

Referring to FIG. 5, the electric vehicle may identify (or determine) presence or absence of a wireless power transmission pad in front of the vehicle in a driving lane based on information provided by a navigation system (or a navigation system control signal) during driving (S510). As an example, the navigation system may transmit a predetermined control signal indicating the presence of the wireless power transmission pad in front of the vehicle to the electrically powered device based on the remaining driving distance from the electric vehicle to the wireless power transmission pad, which is estimated using the current GPS coordinates of the electric vehicle and the GPS coordinates of the wireless power transmission pad, is within a first distance. Thereafter, the electrically powered device may perform macroscopic alignment control in conjunction with the sensor(s) provided in the vehicle.

When the wireless power transmission pad is present in front of the vehicle in the driving lane, the electric vehicle may start estimating the distance to the identified wireless power transmission pad (S520). As an example, the distance to the wireless power transmission pad in front of the vehicle may be estimated based on at least one of the LiDAR, the front camera, or the information provided by the navigation system.

The electric vehicle may align the provided wireless power reception pad with the identified wireless power transmission pad using at least one predefined sensor according to the estimated distance (S530). As an example, the electric vehicle may sequentially perform lateral control and longitudinal control according to the estimated distance. Here, the lateral control may include lateral position control and fine lateral control.

As an example, the lateral position control may be performed based on an image from the front camera and offset information about the wireless power reception pad, and the fine lateral control may be performed based on an image from the SVM camera and the offset information about the wireless power reception pad. In this case, it is assumed that the wireless power transmission pad is installed at the center of the driving lane.

As another example, the lateral position control may be performed based on the image from the front camera, the offset information about the wireless power reception pad, and the offset information about the wireless power transmission pad, and the fine lateral control may be performed based on the image from the SVM camera image, the offset information about the wireless power reception pad, and the offset information about the wireless power transmission pad. In this case, the wireless power transmission pad may be installed to be spaced apart a predetermined distance from the center of the driving lane.

As an example, in the longitudinal control, fine alignment may be performed between the wireless power transmission and reception pads based on the calculated wireless charging efficiency, and/or the measured beam pattern, and/or the measured amount of induced current corresponding to the wireless power received via the wireless power reception pad.

The electric vehicle may perform wireless charging after stopping based on the fine longitudinal alignment being completed (S540).

In an embodiment, the magnitude of wireless power received in the fine longitudinal alignment may be less than the magnitude of the wireless power received in actual wireless charging after completion of the fine longitudinal alignment. To this end, when the fine longitudinal alignment is completed, the electric vehicle may transmit a predetermined control signal to the supply device to request wireless power necessary for charging the battery. As an example, the electric vehicle may make a request for transmission of a specific level of wireless power to the supply device through V2X communication according to the alignment state of the wireless power transmission and reception pads.

Figure 6:
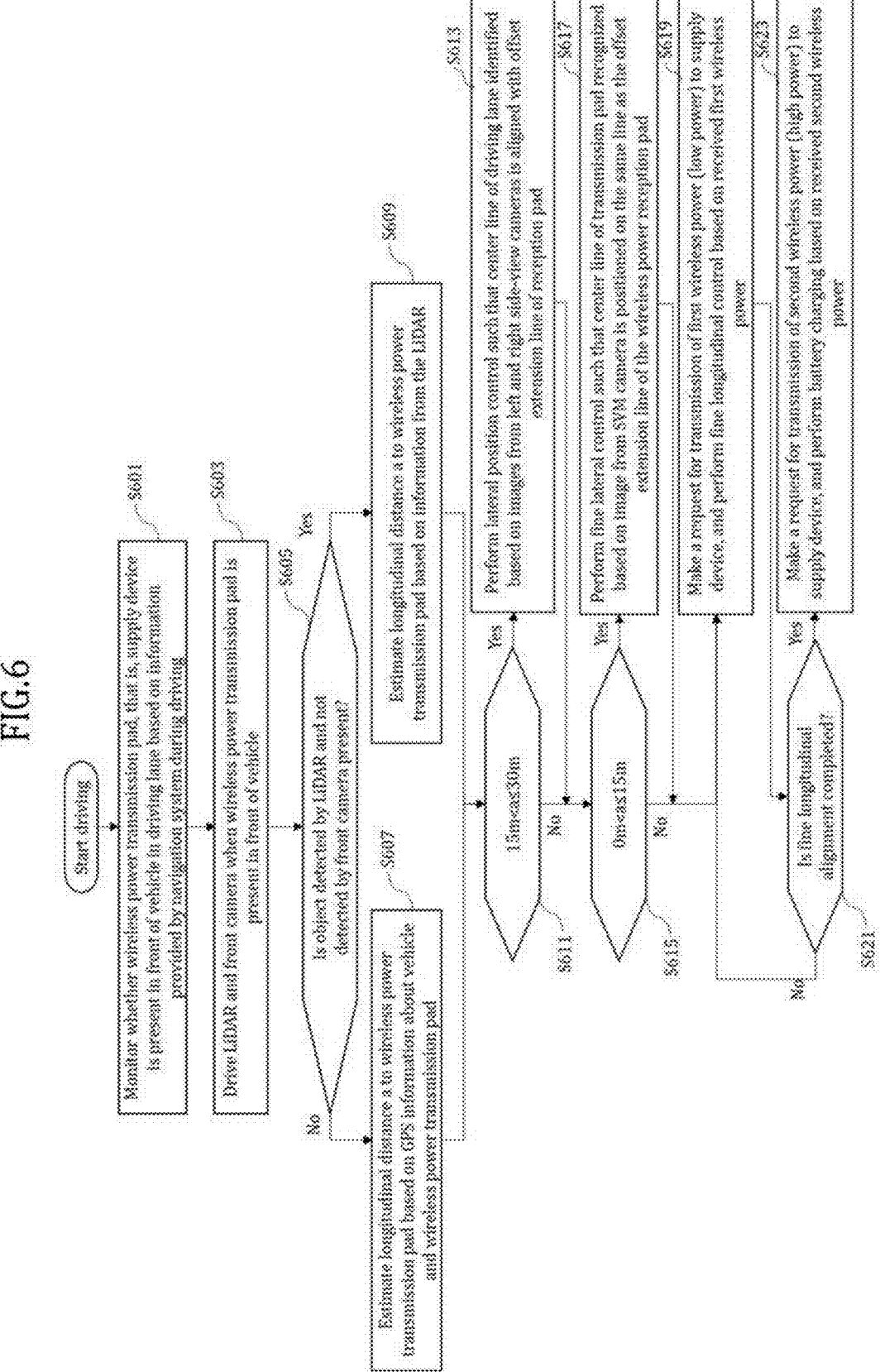
FIG. 6 is a flowchart illustrating a method for macroscopically aligning wireless power transmission and reception pads by a supply device during driving of an electric vehicle according to another embodiment.

FIG. 6 is a flowchart illustrating a method for macroscopically aligning wireless power transmission and reception pads by an electric vehicle during driving according to another embodiment.

Referring to FIG. 6, the electric vehicle may monitor whether a wireless power transmission pad, that is, a supply device is present in front of the vehicle in a driving lane based on information provided by the navigation system during driving (S601).

When a wireless power transmission pad is present in front of the vehicle as a result of the monitoring, the electric vehicle may drive the LiDAR and the front camera provided therein (S603).

The electric vehicle may determine whether an object detected by the LiDAR and undetected by the front camera is present (S605).

When the object is not present, for example, the object is undetected by either the LiDAR or the front camera as a result of the determination, the electric vehicle may estimate the longitudinal distance a to the wireless power transmission pad based on the GPS information about the vehicle and the wireless power transmission pad (S607). Here, the GPS information about the vehicle and the wireless power transmission pad may be information provided by the navigation system.

When the object detected by the LiDAR and undetected by the front camera is present as a result of the determination in operation S605, the electric vehicle may estimate the longitudinal distance a to the wireless power transmission pad based on information from the LiDAR (S609).

When the estimated longitudinal distance is greater than a first distance and less than or equal to a second distance, the electric vehicle may drive the left and right side-view cameras, and perform lateral position control such that the center line of the identified driving lane based on images from the left and right side-view cameras is aligned with an offset extension line of the wireless power reception pad (S611 to S613). In this case, the electric vehicle assumes that the wireless power transmission pad is located at the center of the driving lane. As an example, the first distance may be 15 m and the second distance may be 30 m. However, this is merely one embodiment. The first distance and the second distance may be dynamically determined based on vehicle driving speed information and speed limit information about the driving lane.

When the estimated longitudinal distance is greater than a third distance and less than or equal to the first distance, the electric vehicle may drive the SVM camera, and perform fine lateral control such that the center line of the wireless power transmission pad actually recognized based on an image from the SVM camera is positioned on the same line as the offset extension line of the wireless power reception pad (S615 to S617). As an example, the third distance may be 0 m. However, this is merely one embodiment. The third distance may be dynamically determined based on driving speed information about the vehicle, speed limit information about the driving lane, a reference point of the electric vehicle for distance calculation, and a mounting position of the wireless power reception pad.

When the estimated longitudinal distance is within the third distance, the electric vehicle may make a request for transmission of a first wireless power (low power) to the supply device, and perform fine longitudinal control based on the received first wireless power (S619).

When the fine longitudinal alignment is completed, the electric vehicle may make a request for transmission of a second wireless power (high power) to the supply device, and perform battery charging based on the received second wireless power (S621 to S623).

FIG. 7 specifically illustrates a macroscopic alignment procedure for wireless charging of the electric vehicle according to an embodiment.

As shown in the part assigned reference number 710 in FIG. 7, an electric vehicle may generally detect a metal object, such as a manhole or a wireless power transmission pad, from a relatively long distance using RADAR. However, it is difficult to detect the object located at a long distance through the camera. Accordingly, the electric vehicle may effectively distinguish an object detected through the LiDAR (e.g., a manhole and a wireless power transmission pad) based on the GPS information about the wireless power transmission pad registered in the navigation system, that is, the supply device. In addition, based on the GPS information about the wireless power transmission pad registered in the navigation system and the GPS information about the vehicle, the electric vehicle may estimate the longitudinal distance between the vehicle and the wireless power transmission pad.

Since it is difficult for an electric vehicle to check the exact location of the wireless power transmission pad through the front camera, LiDAR, GPS information, etc., it is first assumed that the wireless power transmission pad is located at the center of the driving lane, as shown in the part 720. Then, the lateral position control may be performed such that the center line of the wireless power reception pad corresponding to the offset of the wireless power reception pad is aligned with the center line of the driving lane.

As shown in the part 730, the electric vehicle may recognize an actual wireless power transmission pad based on an image from the SVM camera or a smart parking assistance system (SPAS) sensor, and identify the center line of the wireless power transmission pad based on the result of the recognition. The electric vehicle may determine a lateral movement value based on the center line of the identified wireless power transmission pad, and may perform lateral fine alignment by slowly moving according to the determined lateral movement value.

When the fine lateral alignment is completed, the electric vehicle may perform fine longitudinal alignment. Referring to the part 740, the electric vehicle may make a request for transmission of wireless power to the supply device for the fine longitudinal alignment. The electric vehicle may determine a stop position based on a change in the amount of induced current corresponding to the received wireless power. As an example, the electric vehicle may determine a point where there is an inflection point of the amount of induced current as the stop position. As another example, the electric vehicle may calculate wireless charging efficiency based on the received wireless power, and determine a point where the calculated wireless charging efficiency is maximized as the stop position. As another example, the electric vehicle may measure a beam pattern corresponding to the received wireless power, and compare the measured beam pattern with a predefined optimal beam pattern. The electric vehicle may determine a point where the similarity of the two beam patterns exceeds a predetermined reference value as the stop position for wireless charging.

While performing the fine longitudinal control during decelerated driving, the electric vehicle according to the embodiment may communicate with the supply device through V2X communication to perform wireless charging.

After the electric vehicle stops according to completion of the fine longitudinal alignment, it may communicate with the supply device through in-band communication to perform wireless charging.

In another embodiment, while performing the fine longitudinal control during decelerated driving, the electric vehicle may communicate with the supply device through V2X communication. After the electric vehicle stops according to completion of the fine longitudinal alignment, it may communicate with the supply device through short-distance wireless communication (e.g., Bluetooth communication) to perform wireless charging.

Figure 8:
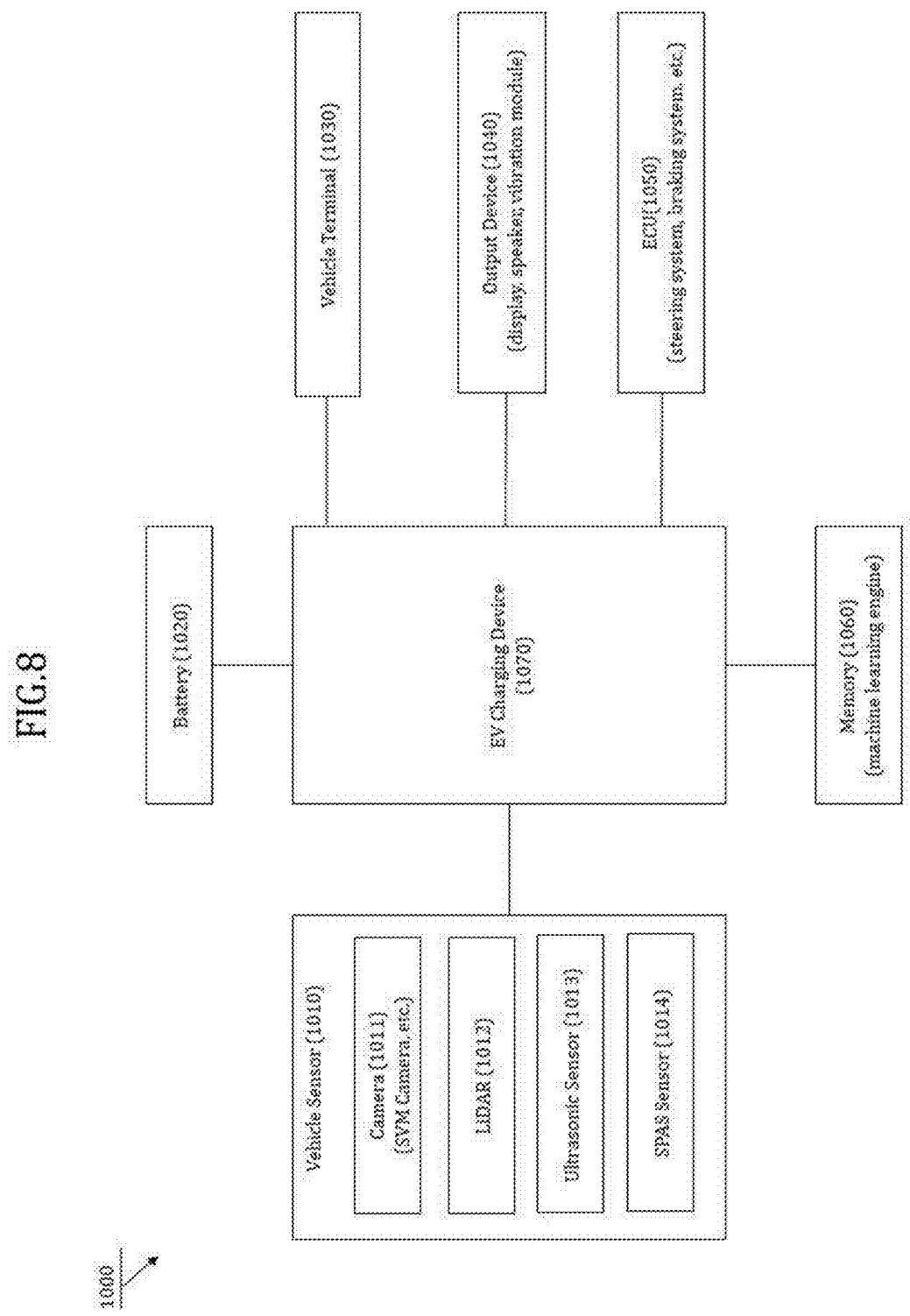
FIG. 8 is a block diagram illustrating a configuration of an electric vehicle according to an embodiment.

FIG. 8 is a block diagram illustrating a configuration of an electric vehicle according to an embodiment.

Referring to FIG. 8, an electric vehicle 1000 may include a vehicle sensor 1010, a battery 1020, a vehicle terminal 1030, an output device 1040, an electronic control unit (ECU) 1050, a memory 1060, and a electrically powered device 1070.

The vehicle sensor 1010 may include, but is not limited to, at least one of a camera 1011, a LiDAR 1012, an ultrasonic sensor 1013, or an SPAS sensor 1014. It may further include radar. According to an embodiment, the camera 1011 may include an SVM camera. The SVM camera may include a front camera, a left/right side-view camera, and a rear camera.

The vehicle sensor 1010, the vehicle terminal 1030, the output device 1040, and the ECU 1050 may be connected to the electrically powered device 1070 over an in-vehicle communication network. Here, the in-vehicle communication network may include, but is not limited to, a controller area network (CAN), a local interconnect network (LIN), a FlexRay, and a media oriented systems transport (MOST) communication network.

The vehicle terminal 1030 may include a mobile communication module for wireless communication with an external device, a GPS module to receive a GPS signal, and a navigation system module to provide a navigation service.

The electrically powered device 1070 may perform a macroscopic alignment control operation for wireless charging during driving. For example, when a wireless power transmission pad is present in front of the vehicle, the electrically powered device 1070 may estimate the distance to the wireless power transmission pad using the provided sensors. Then, it may adaptively drive the sensors according to the estimated distance and perform lateral alignment and longitudinal alignment, thereby aligning the wireless power transmission and reception pads at the correct position.

For the detailed operation of the electrically powered device 1070 for microscopic alignment, refer to the description of the drawings given above.

When the alignment of the wireless power transmission and reception pads is completed, the electrically powered device 1070 may receive wireless power through negotiation with the supply device and charge the battery 1020 in the vehicle.

The memory 1060 may maintain various learning models and learning engines for sensor information-based machine learning, and in particular, may maintain offset information about the wireless power reception pad mounted on the electric vehicle 1000. Here, the offset information may be set to a left (+)/right (−) offset value with respect to the center line of the electric vehicle in units of cm or mm.

FIG. 9 is a flowchart illustrating a method for microscopic alignment of wireless power transmission and reception pads for wireless charging by a supply device according to an embodiment.

Referring to FIG. 9, the supply device may acquire vehicle state information through V2I communication between the electric vehicle and the supply device (S910). Here, the vehicle state information may include, but is not limited to, information about a driving lane, information about whether an electrically powered device is installed, information about a type of the electrically powered device, and information for checking whether the vehicle is stopped, such as, for example, speed information, information about whether an automatic stop function (Auto Hold) is activated, and state information about an ISG (Idle Stop & Go) system.

The supply device may determine whether the electric vehicle is stopped based on the acquired vehicle state information (S920).

When the stop is confirmed, the supply device may make a request to the electric vehicle for generation of an induced current through V2I communication (S930). The electric vehicle may control the induced current to be generated through the wireless power reception pad of the electrically powered device in response to the request for generation of the induced current. In this case, an electromagnetic field may be generated by the generated induced current.

The supply device may measure the current induced in the wireless power transmission pad and measure the shortest distance to the bottom surface of the vehicle using an ultrasonic sensor mounted on one side of the wireless power transmission pad (S940).

The supply device may control the manipulator based on the measured induced current and the shortest distance to finely align the wireless power transmission and reception pads (S950). The supply device may determine the optimal position coordinate by sequentially controlling the pitch, yaw, roll motors of the manipulator such that the measured induced current is maximized, and increase the pneumatic pressure of a pneumatic cylinder at the determined optimal position coordinate to increase the length of the arm. Thereby, it may control the wireless power transmission pad and the wireless power reception pad to maintain the shortest distance.

Based on the fine alignment between the wireless power transmission and reception pads being completed, the supply device may make a request to the electric vehicle for stopping of the generation of the induced current through V2I communication, and may transmit the wireless power necessary for charging of the vehicle battery via the wireless power transmission pad to initiate charging (S960).

FIG. 10 is a flowchart illustrating a method for microscopic alignment of wireless power transmission and reception pads for wireless charging by a supply device to another embodiment.

Referring to FIG. 10, when the supply device detects an electric vehicle, it may initiate a microscopic alignment procedure for wireless charging.

The supply device may receive vehicle state information from the electric vehicle through V2I communication (S1001).

The supply device may determine whether the electric vehicle is stopped based on the received vehicle state information (S1003). When the electric vehicle is stopped as a result of the determination, the supply device may stop inputting current to the wireless power transmission pad (S1005).

The supply device may make a request to the electric vehicle for generation of an induced current (S1007). Here, the request for generation of the induced current may be made through V2I communication, but this is merely one embodiment. According to another embodiment, the supply device make a request to the electric vehicle for generation of an induced current through short-range wireless communication such as, for example, Bluetooth communication, RFID communication, and radio frequency communication. The electric vehicle may control induced power to be generated through the wireless power reception pad of the electrically powered device according to the request for generation of an induced current received from the supply device.

The supply device may measure the current induced in the wireless power transmission pad (S1009).

In addition, the supply device may measure the shortest distance to the bottom surface of the electric vehicle using at least one of ultrasonic sensors provided therein (S1011). Here, the shortest distance to the bottom surface of the electric vehicle may be measured based on at least one of a round trip time (RTT) of an ultrasonic signal and the separation distance between the ultrasonic sensors. The method of measuring the shortest distance using the ultrasonic sensors will be more clearly understood from the description of the drawings given below.

The supply device may determine whether the place where the wireless power transmission pad is installed is an intersection (S1013). Here, the information about the installation location of the wireless power transmission pad may be pre-registered and maintained in the internal memory of the supply device, but this is merely one embodiment. The supply device may acquire, from the electric vehicle, information about the place where the wireless power transmission pad is installed. As an example, the electric vehicle may transmit information about the location of the wireless power transmission pad registered in the navigation system provided therein to the supply device through V2I communication. As another example, the supply device may acquire information about the location where the wireless power transmission pad is mounted through I2I communication with a nearby traffic infrastructure, for example, a road side unit (RSU). As another example, the supply device may identify the place where the wireless power transmission pad connected thereto is mounted, in conjunction with a separate central server connected to the supply device in a wired or wireless manner.

When the place where the wireless power transmission pad is installed is an intersection, the supply device may acquire information about the remaining stop time in the corresponding lane from the signal control system through I2I communication (S1015).

The supply device may determine whether the remaining stop time is greater than or equal to a predetermined reference value (S1017).

When the remaining stop time is greater than or equal to the reference value as a result of the determination, the supply device may determine that wireless charging is allowed, and may perform fine alignment of the wireless power transmission and reception pads by controlling the provided manipulator (S1019).

The supply device may determine whether the fine alignment is completed based on the measured intensity of the induced current (S1021). As an example, when the position coordinates at which the current induced in the wireless power transmission pad is maximized is determined, the supply device may determine that the fine alignment between the wireless power transmission and reception pads is completed. As another example, when the position coordinates at which the beam pattern of the current induced in the wireless power transmission pad is closest to a preset or predefined optimal beam pattern is determined, the supply device may determine that the fine alignment between the wireless power transmission and reception pads is completed.

When the fine alignment is completed, the supply device may make a request to the electric vehicle for stopping of generation of the induced current (S1023). The electric vehicle may stop inputting current to the wireless power reception pad in response to the request for stopping of generation of the induced current.

The supply device may perform negotiation for transmission power with an electrically powered device of the electric vehicle (S1025).

The supply device may transmit wireless power via the wireless power transmission pad according to the result of the negotiation (S1027). The electrically powered device of the electric vehicle may charge the battery by rectifying the wireless power induced in the wireless power reception pad.

In operation S1013, when the place where the wireless power transmission pad is installed is not an intersection (for example, the place where the wireless power transmission pad is installed is a parking lot), the supply device may perform operation S1019 to perform the fine alignment procedure.

In operation S1017, when the length of the remaining stop signal is less than a predetermined reference value, the supply device may control the fine alignment procedure to be skipped (S1029).

The manipulator applied according to an embodiment of the present invention for fine alignment of the wireless power transmission and reception pads is a mechanical device that provides a joint motion similar to that of a human arm. The joint motion may include a pitch, yaw, and roll motions, and the wireless power transmission pad may be positioned in a specific coordinate space. Here, the joints of pitch, yaw and roll are called orientation axes.

Also, the points at which the manipulator bends, slides, and rotates are called joints or position axes. The manipulator is implemented by using mechanical devices such as links, gears, actuators and feedback mechanisms.

FIG. 11 is a flowchart illustrating a procedure for fine alignment of wireless power transmission and reception pads using a manipulator according to an embodiment.

The manipulator according to the embodiment may be configured as a three-axis manipulator having four degrees of freedom as shown in FIG. However, embodiments are not limited thereto. The manipulator may be configured as a multi-axis manipulator of three or more axes for more precise alignment according to the design by those skilled in the art.

Referring to FIG. 11, the supply device may sequentially control the pitch, yaw, and roll of the manipulator according to the induced current measured on the wireless power transmission pad to determine the position coordinate of the manipulator where the induced current is maximized (S1110).

The supply device may increase the length of the arm of the pneumatic (or hydraulic) cylinder by increasing the pneumatic pressure (or hydraulic pressure) at the determined position coordinate to (S1120).

The supply device may detect the bottom surface of the vehicle through an ultrasonic sensor to monitor whether the wireless power transmission pad collides with the lower part of the vehicle during adjustment of the length of the arm (S1130).

The supply device may stop the movement of the arm when the distance between the wireless power transmission and reception pads reaches a predefined minimum distance or a collision is expected (S1140).

Figure 12:
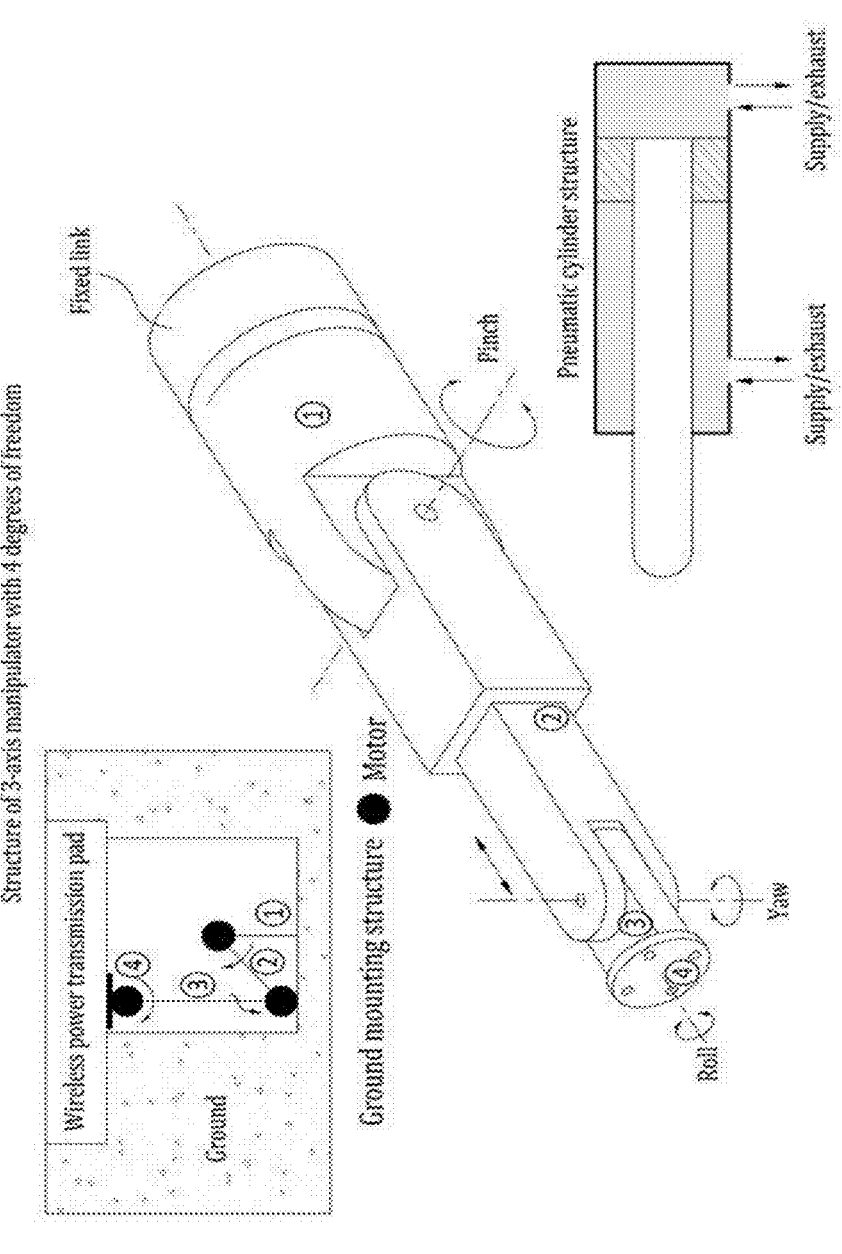
FIG. 12 shows a structure of the manipulator according to an embodiment.

FIG. 12 shows a structure of the manipulator according to an embodiment.

The wireless power transmission method according to the embodiment uses the effect of magnetic resonance induction. Accordingly, as the spacing between the wireless power transmission and reception pads facing each other in parallel decreases, the wireless charging efficiency may be increased. Therefore, the proposed method of fine aligning of the wireless power transmission and reception pads may be implemented using a 3-axis manipulator having a robot arm structure for the wireless power transmission pad installed on the ground.

Therefore, according to the present disclosure, even when the driver stopping the electric vehicle for wireless charging fails to accurately align the transmission and reception pads, the supply device may control the manipulator based on the measured induced current to optimally align the position of the wireless power transmission pad. Thereby, wireless charging efficiency may be maximized.

The manipulator according to the embodiment may be provided with each motor for controlling pinch, yaw, and roll motions, and may also be provided with a pneumatic (or hydraulic) cylinder to adaptively control the length of the arm.

As shown in FIG. 12, the manipulator may be configured to have four degrees of freedom by controlling the pinch/yaw/roll motions and the pneumatic pressure of the pneumatic cylinder.

When the electric vehicle requires wireless power transmission, the supply device may first operate the pitch motor to separate the wireless power transmission pad from the ground, and control the yaw motor and the roll motor according to the induced current measured on the wireless power transmission pad to find the optimal alignment position for the wireless power transmission and reception pads. When the optimal alignment position is determined, the supply device may control the pneumatic cylinder to increase the length of the arm, thereby minimizing the gap between the wireless power transmission and reception pads.

Figure 13:
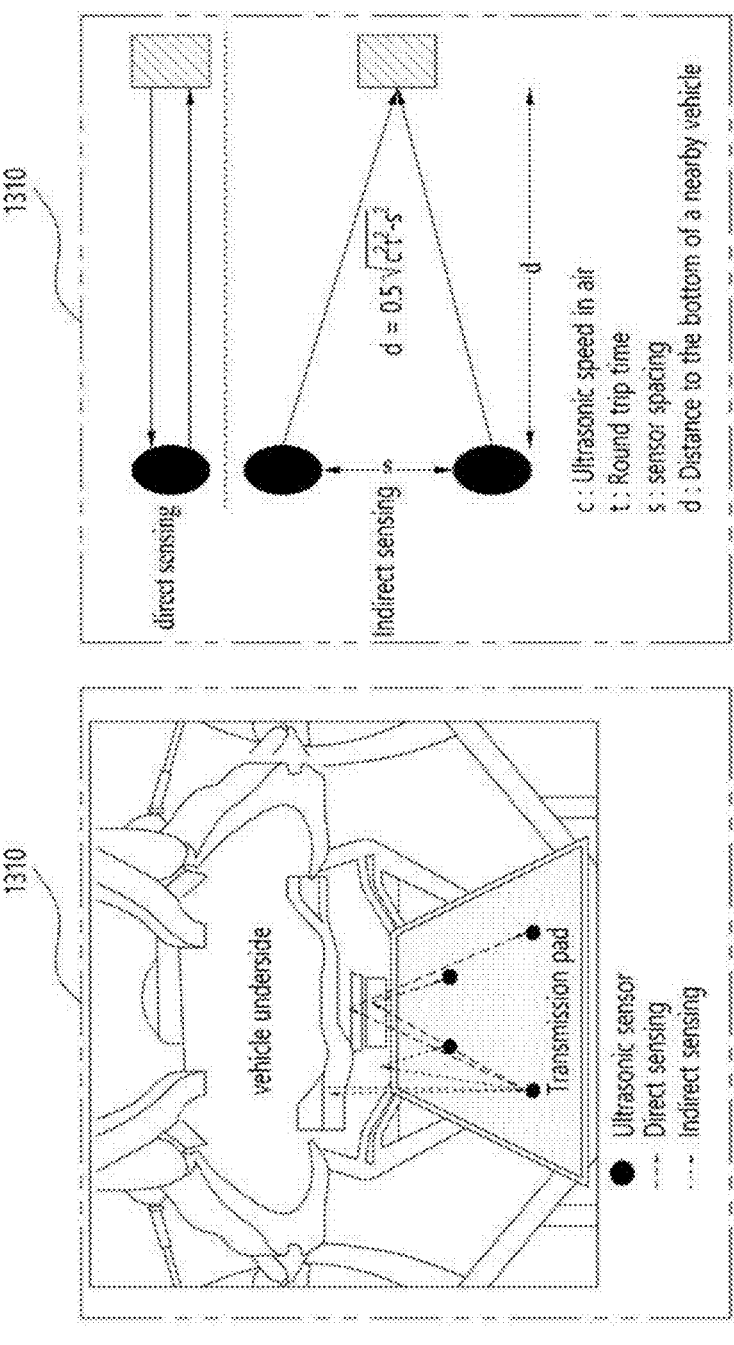
FIG. 13 illustrates a method of detecting a bottom surface of a vehicle using an ultrasonic sensor according to an embodiment.

FIG. 13 illustrates a method of detecting a bottom surface of a vehicle using an ultrasonic sensor according to an embodiment.

The bottom of the vehicle is not a flat surface, but has a multi-layered complex structure as shown in the part assigned reference numeral 1310. Therefore, when the wireless power transmission pad is brought close to the wireless power reception pad using the pneumatic cylinder of the manipulator, the wireless power transmission pad may collide with the bottom surface of the vehicle and be damaged if the bottom surface of the vehicle is not accurately detected.

In order to prevent such a collision, at least one ultrasonic sensor may be mounted on the wireless power transmission pad to detect the shortest distance to the bottom surface of the vehicle.

Other sensors such as a laser sensor may be used in place of the ultrasonic sensor. However, when the distance is measured using the laser sensor, only the distance in front of the sensor may be measured and it may be difficult to detect the entire bottom surface of the vehicle.

Referring to the part assigned reference number 1310 in FIG. 13, four ultrasonic sensors may be mounted on one side of four corners of the wireless power transmission pad, as an example. In this case, the supply device may control the four ultrasonic sensors to transmit ultrasonic signals in a time division manner. Since the ultrasonic signal reflected from the bottom surface of the vehicle is received by all the ultrasonic sensors, the supply device may measure the shortest distance to the entire bottom surface of the vehicle including the surface in front of the host ultrasonic sensor through indirect sensing as well as direct sensing.

The supply device may measure an RTT for the ultrasonic signal, and measure the minimum distance from the wireless power transmission pad to the bottom surface of the vehicle based on the measured RTT.

The method for detecting the bottom surface of the vehicle by the supply device may be largely divided into direct sensing and indirect sensing, as illustrated in the part assigned reference numeral 1320.

The direct sensing is a method of measuring the distance d from the wireless power transmission pad to the bottom surface of the vehicle based on the result of measurement of the RTT for the signal of the ultrasonic sensor reflected on the bottom surface of the vehicle and received by the ultrasonic sensor.

The indirect sensing is a method of measuring the distance d from the wireless power transmission pad to the bottom surface of the vehicle based on the RTT for the signal of another ultrasonic sensor reflected on the bottom surface of the vehicle and received, and the distance s between the target ultrasonic sensors.

Accordingly, according to the present disclosure, the shortest distance for collision avoidance may be efficiently calculated by directly/indirectly sensing a complex bottom surface of a vehicle body using multiple ultrasonic sensors.

The operations of the supply device according to the above-described embodiments of FIGS. 9 to 13 may be performed under control of the control communication unit 13 of FIG. 3 described above.

The electrically powered device described in relation to the embodiments disclosed in the present disclosure may include at least one transceiver configured to transmit and receive signals to and from a vehicle display, a vehicle terminal and various ECUs connected over the in-vehicle communication network, external network equipment connected over an external wired/wireless communication network, and an electrically powered device of another vehicle, and a user device, at least one processor connected to the at least one transceiver to control the overall operation, and a memory having a program recorded thereon for an operation of the at least one processor.

The supply device described in relation to the embodiments disclosed in the present disclosure may include a first transceiver configured to transmit and receive signals to and from the electrically powered device through in-band (or out-of-band) communication, and receives power from the power supply network, a second transceiver configured to receive power from a power supply network and transmit and receive various kinds of control signals to and from the power supply network, at least one processor connected to the first and second transceivers to control the overall operation, and a memory having a program recorded thereon for the operation of the processor.

Steps in a method or algorithm described in relation to the embodiments disclosed herein may be directly implemented in hardware, a software module, or a combination of the two, executed by a processor. The software module may reside in a storage medium (i.e., a memory and/or storage) such as a RAM, a flash memory, a ROM, an EPROM, an EEPROM, a registers, a hard disk, a removable disk, or a CD-ROM.

An exemplary storage medium may be coupled to the processor, the processor may read information from, and write information to, the storage medium. Alternatively, the storage medium may be integrated with the processor. The processor and storage medium may reside within an application specific integrated circuit (ASIC). The ASIC may reside within the user terminal. Alternatively, the processor and storage medium may reside as separate components within the user terminal.

The above description is merely illustrative of the technical spirit of the present disclosure. It will be apparent to those skilled in the art that various modifications and variations can be made in the present disclosure without departing from the spirit and scope of the disclosure.

Therefore, the embodiments disclosed in the present disclosure are merely illustrative of the technical spirit of the present disclosure. The scope of the technical spirit of the present disclosure is not limited by these embodiments. The scope of the present disclosure should be construed by the appended claims, and all technical ideas within the scope equivalent thereto should be construed as being within the scope of the present disclosure.

What is claimed is:

1. A microscopic alignment method for wirelessly charging an electric vehicle by a supply device, the method comprising:
   determining whether the electric vehicle is stopped;
   based on the electric vehicle being stopped, making a request to the electric vehicle for generation of an induced current;
   measuring the induced current received through a wireless power transmission pad;
   performing fine alignment of the wireless power transmission pad based on the induced current;
   based on the fine alignment being completed, transmitting wireless power via the wireless power transmission pad; and
   acquiring information about a mounting location of the wireless power transmission pad,
   wherein, based on the wireless power transmission pad being mounted at an intersection, information about a remaining stop time is acquired from a signal control system through infrastructure-to-infrastructure (I2I) communication.

2. The method of claim 1, further comprising:
   acquiring vehicle state information about the electric vehicle through vehicle-to-infrastructure (V2I) communication,
   wherein whether the electric vehicle is stopped is determined based on the vehicle state information.

3. The method of claim 1, wherein performing the fine alignment comprises:
   controlling a manipulator according to the induced current and determining a position coordinate value at which the induced current is maximized; and
   controlling a pneumatic cylinder of the manipulator based on the position coordinate value and moving the wireless power transmission pad closer to a wireless power reception pad of the electric vehicle.

4. The method of claim 3, further comprising:
   driving a plurality of ultrasonic sensors disposed in the wireless power transmission pad in a time division manner; and
   measuring a minimum distance to a bottom surface of the electric vehicle using the ultrasonic sensors, wherein the wireless power transmission pad is moved closer to the wireless power reception pad of the electric vehicle based on the minimum distance.

5. The method of claim 4, wherein measuring the minimum distance to the bottom surface of the electric vehicle comprises:
   measuring a round trip time (RTT) of an ultrasound signal; and
   measuring the minimum distance based on one or both of the RTT and a distance between the ultrasonic sensors.

6. The method of claim 3, wherein the manipulator is a three-axis manipulator having four degrees of freedom and configured to sequentially perform pitch, yaw, and roll motions.

7. The method of claim 1, wherein, based on the remaining stop time being greater than or equal to a reference value, the fine alignment of the wireless power transmission pad is performed, and
   wherein, based on the remaining stop time being less than the reference value, the fine alignment is skipped.

8. The method of claim 1, further comprising:
   based on the fine alignment being completed, making a request to the electric vehicle for stopping the generation of the induced current;
   determining transmission power through negotiation for power with an electrically powered device of the electric vehicle; and
   transmitting the transmission power via the wireless power transmission pad.

9. A non-volatile computer-readable storage medium storing at least one computer program including instructions that, when executed by at least one processor, cause a supply device provided with the at least one processor to perform alignment operations for wireless charging of an electric vehicle, the operations comprising:
   determining whether the electric vehicle is stopped;
   based on the electric vehicle being stopped, making a request to the electric vehicle for generation of an induced current;
   measuring the induced current received through a wireless power transmission pad;
   performing fine alignment of the wireless power transmission pad based on the induced current;
   based on the fine alignment being completed, transmitting wireless power via the wireless power transmission pad; and
   acquiring information about a mounting location of the wireless power transmission pad,
   wherein, based on the wireless power transmission pad being mounted at an intersection, information about a remaining stop time is acquired from a signal control system through infrastructure-to-infrastructure (I2I) communication.

10. A supply device comprising:
   a wireless power transmission pad configured to wirelessly transmit an alternating current (AC) power;
   a power conversion system configured to convert an externally supplied power into the AC power;
   a manipulator configured to adjust a position of the wireless power transmission pad; and
   a control communication unit configured to:
   determine whether an electric vehicle is stopped;
   based on the electric vehicle being stopped, make a request to the electric vehicle for generation of an induced current;
   measuring the induced current received through the wireless power transmission pad;

control the manipulator based on the induced current to perform fine alignment of the wireless power transmission pad; and based on the fine alignment being completed, control the power conversion system to transmit wireless power via the wireless power transmission pad, wherein, based on the wireless power transmission pad being mounted at an intersection, the control communication unit is configured to acquire information about a remaining stop time from a signal control system through infrastructure-to-infrastructure (I2I) communication.

11. The supply device of claim 10, wherein the control communication unit is configured to acquire vehicle state information about the electric vehicle through vehicle-to-infrastructure (V2I) communication, and to determine whether the electric vehicle is stopped based on the vehicle state information.

12. The supply device of claim 10, wherein the control communication unit is configured to control the manipulator according to the induced current to determine a position coordinate value at which the induced current is maximized, and to control a pneumatic cylinder of the manipulator based on the position coordinate value to move the wireless power transmission pad closer to a wireless power reception pad of the electric vehicle.

13. The supply device of claim 12, further comprising:

a plurality of ultrasonic sensors disposed on one side of the wireless power transmission pad, wherein the control communication unit is configured to drive the plurality of ultrasonic sensors in a time division manner to measure a minimum distance to a bottom surface of the electric vehicle using the ultrasonic sensors, and to control the manipulator based on the minimum distance to move the wireless power transmission pad closer to the wireless power reception pad of the electric vehicle.

14. The supply device of claim 13, wherein the control communication unit is configured to measure a round trip time (RTT) of an ultrasound signal, and to measure the minimum distance based on one or both of the RTT and a distance between the ultrasonic sensors.

15. The supply device of claim 10, wherein the manipulator is a three-axis manipulator having four degrees of freedom configured to sequentially perform pitch, yaw, and roll motions.

16. The supply device of claim 10, wherein, based on the remaining stop time being greater than or equal to a reference value, the control communication unit is configured to perform the fine alignment of the wireless power transmission pad, wherein, based on the remaining stop time being less than the reference value, the control communication unit is configured to perform a control operation to skip the fine alignment.

17. The supply device of claim 10, wherein the control communication unit is configured to:

based on the fine alignment being completed, make a request to the electric vehicle for stopping the generation of the induced current;

determine transmission power through negotiation for power with an electrically powered device of the electric vehicle; and control the power conversion system according to the transmission power to generate the AC power.

* * * * *